(12) United States Patent
Yoo et al.

(10) Patent No.: US 12,506,873 B2
(45) Date of Patent: Dec. 23, 2025

(54) METHOD AND DEVICE FOR CODING/DECODING IMAGE USING DIFFERENTIAL CODING OF RESIDUAL COEFFICIENT, AND METHOD FOR TRANSMITTING BITSTREAM

(71) Applicant: LG ELECTRONICS INC., Seoul (KR)

(72) Inventors: Sunmi Yoo, Seoul (KR); Jin Heo, Seoul (KR); Jangwon Choi, Seoul (KR); Jung Ah Choi, Seoul (KR); Seung Hwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 341 days.

(21) Appl. No.: 17/604,237

(22) PCT Filed: Apr. 14, 2020

(86) PCT No.: PCT/KR2020/005047
§ 371 (c)(1),
(2) Date: Oct. 15, 2021

(87) PCT Pub. No.: WO2020/213931
PCT Pub. Date: Oct. 22, 2020

(65) Prior Publication Data
US 2022/0210430 A1 Jun. 30, 2022

Related U.S. Application Data

(60) Provisional application No. 62/834,953, filed on Apr. 16, 2019.

(51) Int. Cl.
*H04N 19/137* (2014.01)
*H04N 19/124* (2014.01)
(Continued)

(52) U.S. Cl.
CPC ......... *H04N 19/137* (2014.11); *H04N 19/124* (2014.11); *H04N 19/159* (2014.11); *H04N 19/176* (2014.11)

(58) Field of Classification Search
None
See application file for complete search history.

(56) References Cited

U.S. PATENT DOCUMENTS

2018/0084284 A1 3/2018 Rosewarne et al.
2020/0296381 A1* 9/2020 Coban .................. H04N 19/159

OTHER PUBLICATIONS

Joint Video Experts Team (JVET) of ITU-T SG 16 WP 3 and ISO/IEC JTC 1/SC 29/WG 11 14th Meeting: Geneva, CH, Mar. 19-27, 2019, JVET-N0413, "CE8-related: Quantized residual BDPCM", by Marta Karczewicz & Muhammed Coban (Year: 2019).*

(Continued)

*Primary Examiner* — Clifford Hilaire
(74) *Attorney, Agent, or Firm* — Bryan Cave Leighton Paisner LLP

(57) ABSTRACT

An image encoding/decoding method and apparatus are provided. An image decoding method performed by an image decoding apparatus may include obtaining a residual block of a current block encoded in an intra prediction mode from a bitstream, deriving a modified residual block by performing differential encoding with respect to the residual block, based on differential encoding mode information obtained from the bitstream indicating a differential encoding mode of a residual coefficient, and deriving a residual block of the current block by performing dequantization with respect to the modified residual block.

15 Claims, 27 Drawing Sheets

(51) Int. Cl.
  *H04N 19/159* (2014.01)
  *H04N 19/176* (2014.01)

(56) References Cited

OTHER PUBLICATIONS

Mohsen Abdoli, et al., "AHG11: Block DPCM for Screen Content Coding", Joint Video Experts Team (JVET) of ITU-T SG 16 WP 3 and ISO/IEC JTC 1/SC 29/WG 11, 12th Meeting: Macao, CN, Oct. 3-12, 2018. AHG11: Block DPCM for Screen Content Coding. JVET-L0078.

Mohsen Abdoli, et al., "CE8: Bdpcm with horizontal/vertical predictor and independently decodable areas (test 8.3.1b)", Joint Video Experts Team (JVET) of ITU-T SG 16 WP 3 and ISO/IEC JTC 1/SC 29/WG 11, 13th Meeting: Marrakech, MA, Jan. 9-18, 2019. JVET-M0057.

B. Bross, et al., "Non-CE8: Unified Transform Type Signalling and Residual Coding for Transform Skip", Joint Video Experts Team (JVET) of ITU-T SG 16 WP 3 and ISO/IEC JTC 1/SC 29/WG 11, 13th Meeting: Marrakech, MA, Jan. 9-18, 2019. JVET-M0464-v43.

Marta Karczewicz, et al. "CE8-related: Quantized residual BDPCM", Joint Video Experts Team (JVET) of ITU-T SG 16 WP 3 and ISO/IEC JTC 1/SC 29/WG 11, 14th Meeting: Geneva, CH, Mar. 19-27, 2019.

\* cited by examiner

FIG. 4
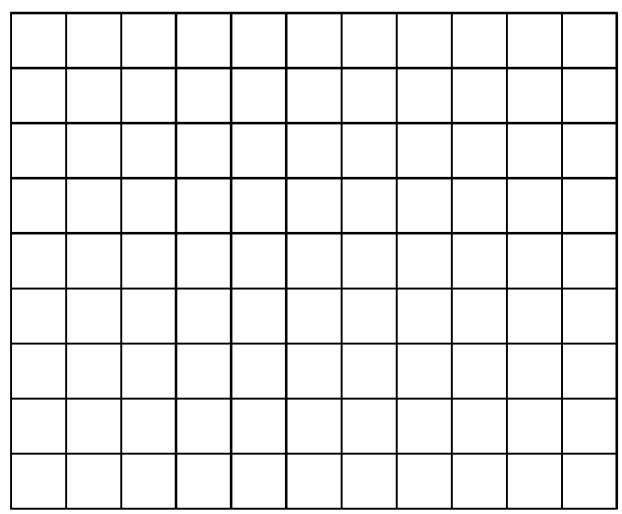
FIG. 5
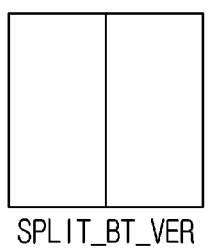 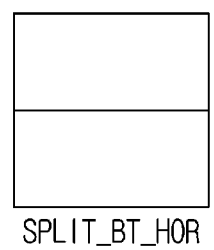 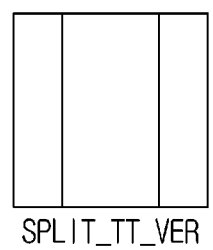 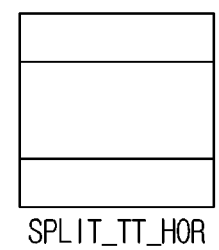
SPLIT_BT_VER　　SPLIT_BT_HOR　　SPLIT_TT_VER　　SPLIT_TT_HOR

FIG. 11

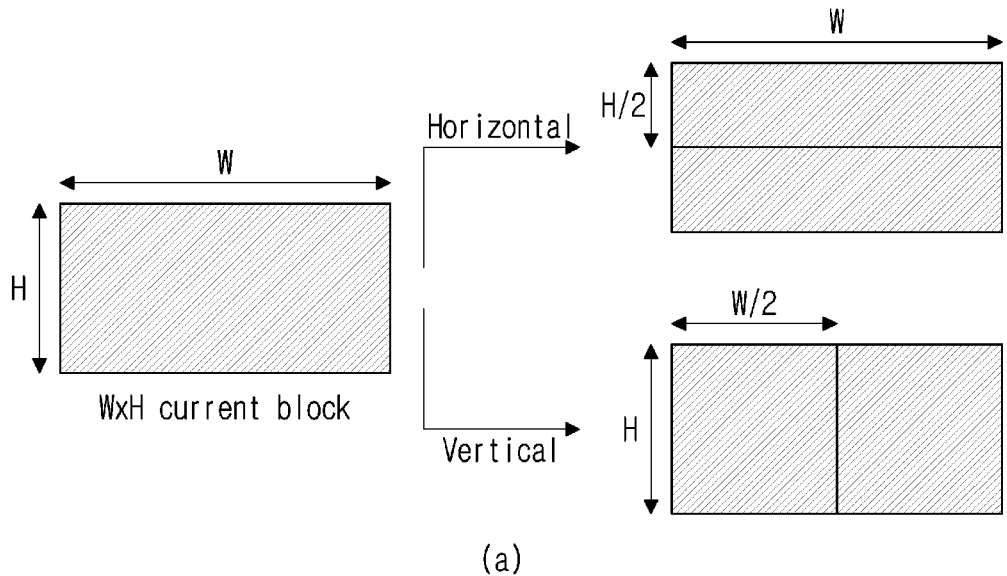

(a)

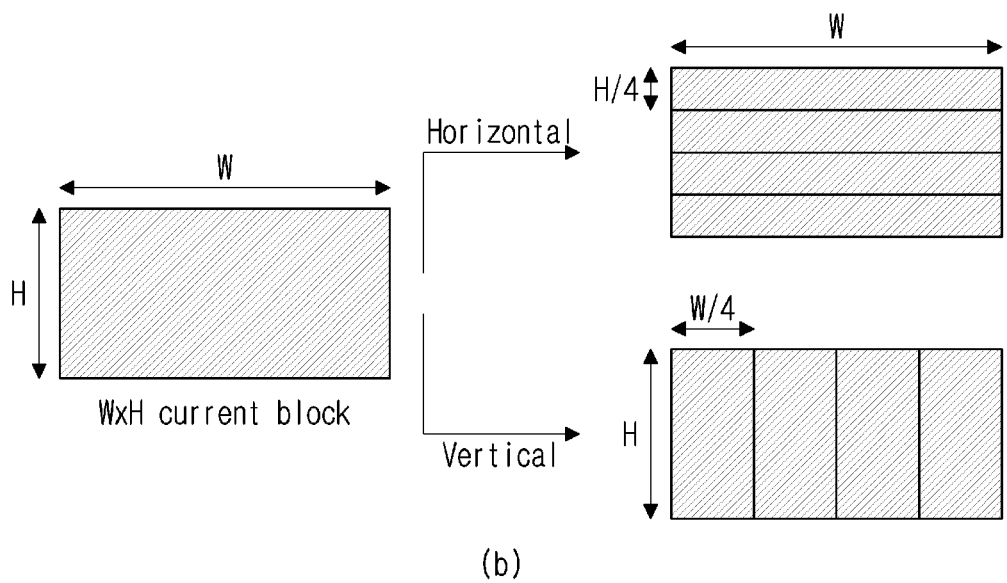

| coding_unit( x0, y0, cbWidth, cbHeight, cqtDepth, treeType, modeType ) { | Descriptor |
|---|---|
| ... | |
|     if (intra_luma_ref_idx[ x0 ][ y0 ] == 0 && <br>      ( cbWidth <= MaxTbSizeY \|\| cbHeight <= MaxTbSizeY ) && <br>      ( cbWidth * cbHeight > MinTbSizeY * MinTbSizeY )) | |
|         intra_subpartitions_mode_flag[ x0 ][ y0 ] | ae(v) |
|     if( intra_subpartitions_mode_flag[ x0 ][ y0 ] == 1 && <br>      cbWidth <= MaxTbSizeY && cbHeight <= MaxTbSizeY ) | |
|         intra_subpartitions_split_flag[ x0 ][ y0 ] | ae(v) |
| ... | |

FIG. 14

| residual_coding( x0, y0, log2TbWidth, log2TbHeight, cIdx ) { | Descriptor |
|---|---|
|   if( ( tu_mts_idx[ x0 ][ y0 ] > 0 \|\| <br>     ( cu_sbt_flag && log2TbWidth < 6 && log2TbHeight < 6 ) ) <br>     && cIdx == 0 && log2TbWidth > 4 ) | |
|     log2TbWidth = 4 | |
|   else | |
|     log2TbWidth = Min( log2TbWidth, 5 ) | |
|   if( tu_mts_idx[ x0 ][ y0 ] > 0 \|\| <br>     ( cu_sbt_flag && log2TbWidth < 6 && log2TbHeight < 6 ) ) <br>     && cIdx == 0 && log2TbHeight > 4 ) | |
|     log2TbHeight = 4 | |
|   else | |
|     log2TbHeight = Min( log2TbHeight, 5 ) | |
|   if( log2TbWidth > 0 ) | |
|     last_sig_coeff_x_prefix | ae(v) |
|   if( log2TbHeight > 0 ) | |
|     last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   log2SbW = ( Min( log2TbWidth, log2TbHeight ) < 2 ? 1 : 2 ) | |
|   log2SbH = log2SbW | |
|   if ( log2TbWidth < 2 && cIdx == 0 ) { | |
|     log2SbW = log2TbWidth | |
|     log2SbH = 4 − log2SbW | |
|   } else if ( log2TbHeight < 2 && cIdx == 0 ) { | |
|     log2SbH = log2TbHeight | |
|     log2SbW = 4 − log2SbH | |
|   } | |
|   numSbCoeff = 1 << ( log2SbW + log2SbH ) | |
|   lastScanPos = numSbCoeff | |
|   lastSubBlock = ( 1 << ( log2TbWidth + log2TbHeight − ( log2SbW + log2SbH ) ) ) − 1 | |

FIG. 15

| | |
|---|---|
| do { | |
|   if( lastScanPos  = =  0 ) { | |
|     lastScanPos = numSbCoeff | |
|     lastSubBlock− − | |
|   } | |
|   lastScanPos− − | |
|   xS = DiagScanOrder[ log2TbWidth − log2SbW ][ log2TbHeight − log2SbH ]<br>    [ lastSubBlock ][ 0 ] | |
|   yS = DiagScanOrder[ log2TbWidth − log2SbW ][ log2TbHeight − log2SbH ]<br>    [ lastSubBlock ][ 1 ] | |
|   xC = ( xS << log2SbW ) + DiagScanOrder[ log2SbW ][ log2SbH ][ lastScanPos ][ 0 ] | |
|   yC = ( yS << log2SbH ) + DiagScanOrder[ log2SbW ][ log2SbH ][ lastScanPos ][ 1 ] | |
| } while( ( xC != LastSignificantCoeffX ) \|\| ( yC != LastSignificantCoeffY ) ) | |
| QState = 0 | |
| for( i = lastSubBlock; i  >=  0; i− − ) { | |
|   startQStateSb = QState | |
|   xS = DiagScanOrder[ log2TbWidth − log2SbW ][ log2TbHeight − log2SbH ]<br>    [ lastSubBlock ][ 0 ] | |
|   yS = DiagScanOrder[ log2TbWidth − log2SbW ][ log2TbHeight − log2SbH ]<br>    [ lastSubBlock ][ 1 ] | |
|   inferSbDcSigCoeffFlag = 0 | |
|   if( ( i < lastSubBlock ) && ( i > 0 ) ) { | |
|     coded_sub_block_flag[ xS ][ yS ] | ae(v) |
|     inferSbDcSigCoeffFlag = 1 | |
|   } | |
|   firstSigScanPosSb = numSbCoeff | |
|   lastSigScanPosSb = −1 | |
|   remBinsPass1 = ( ( log2SbW + log2SbH ) < 4 ? 8 : 32 ) | |
|   firstPosMode0 = ( i  = =  lastSubBlock ? lastScanPos : numSbCoeff − 1 ) | |
|   firstPosMode1 = −1 | |
|   for( n = firstPosMode0; n  >=  0 && remBinsPass1  >= 4; n− − ) { | |
|     xC = ( xS << log2SbW ) + DiagScanOrder[ log2SbW ][ log2SbH ][ n ][ 0 ] | |
|     yC = ( yS << log2SbH ) + DiagScanOrder[ log2SbW ][ log2SbH ][ n ][ 1 ] | |
|     if( coded_sub_block_flag[ xS ][ yS ] && ( n > 0 \|\| !inferSbDcSigCoeffFlag ) &&<br>      ( xC != LastSignificantCoeffX \|\| yC != Last SignificantCoeffY ) ) { | |
|       sig_coeff_flag[ xC ][ yC ] | ae(v) |
|       remBinsPass1− − | |
|       if( sig_coeff_flag[ xC ][ yC ] ) | |
|         inferSbDcSigCoeffFlag = 0 | |
|     } | |
|     if( sig_coeff_flag[ xC ][ yC ] ) { | |
|       abs_level_gtx_flag[ n ][ 0 ] | ae(v) |
|       remBinsPass1− − | |
|       if( abs_level_gtx_flag[ n ][ 0 ] ) { | |
|         par_level_flag[ n ] | ae(v) |
|         remBinsPass1− − | |
|         abs_level_gtx_flag[ n ][ 1 ] | ae(v) |
|         remBinsPass1− − | |

FIG. 16

| | |
|---|---|
| } | |
| if( lastSigScanPosSb == −1 ) | |
| lastSigScanPosSb = n | |
| firstSigScanPosSb = n | |
| } | |
| AbsLevelPass1[ xC ][ yC ] = sig_coeff_flag[ xC ][ yC ] + par_level_flag[ n ] + <br> abs_level_gtx_flag[ n ][ 0 ] + 2 * abs_level_gtx_flag[ n ][ 1 ] | |
| if( dep_quant_enabled_flag ) | |
| QState = QStateTransTable[ QState ][ AbsLevelPass1[ xC ][ yC ] & 1 ] | |
| if( remBinsPass1 < 4 ) | |
| firstPosMode1 = n − 1 | |
| } | |
| for( n = numSbCoeff − 1; n >= firstPosMode1; n− − ) { | |
| xC = ( xS << log2SbW ) + DiagScanOrder[ log2SbW ][ log2SbH ][ n ][ 0 ] | |
| yC = ( yS << log2SbH ) + DiagScanOrder[ log2SbW ][ log2SbH ][ n ][ 1 ] | |
| if( abs_level_gtx_flag[ n ][ 1 ] ) | |
| abs_remainder[ n ] | ae(v) |
| AbsLevel[ xC ][ yC ] = AbsLevelPass1[ xC ][ yC ] +2 * abs_remainder[ n ] | |
| } | |
| for( n = firstPosMode1; n >= 0; n− − ) { | |
| xC = ( xS << log2SbW ) + DiagScanOrder[ log2SbW ][ log2SbH ][ n ][ 0 ] | |
| yC = ( yS << log2SbH ) + DiagScanOrder[ log2SbW ][ log2SbH ][ n ][ 1 ] | |
| dec_abs_level[ n ] | ae(v) |
| if(AbsLevel[ xC ][ yC ] > 0 ) | |
| firstSigScanPosSb = n | |
| if( dep_quant_enabled_flag ) | |
| QState = QStateTransTable[ QState ][ AbsLevel[ xC ][ yC ] & 1 ] | |
| } | |
| if( dep_quant_enabled_flag \|\| !sign_data_hiding_enabled_flag ) | |
| signHidden = 0 | |
| else | |
| signHidden = ( lastSigScanPosSb − firstSigScanPosSb > 3 ? 1 : 0 ) | |
| for( n = numSbCoeff − 1; n >= 0; n− − ) { | |
| xC = ( xS << log2SbW ) + DiagScanOrder[ log2SbW ][ log2SbH ][ n ][ 0 ] | |
| yC = ( yS << log2SbH ) + DiagScanOrder[ log2SbW ][ log2SbH ][ n ][ 1 ] | |
| if( ( AbsLevel[ xC ][ yC ] > 0 ) && <br> ( !signHidden \|\| ( n != firstSigScanPosSb ) ) ) | |
| coeff_sign_flag[ n ] | ae(v) |
| } | |
| if( dep_quant_enabled_flag ) { | |
| QState = startQStateSb | |
| for( n = numSbCoeff − 1; n >= 0; n− − ) { | |
| xC = ( xS << log2SbW ) + DiagScanOrder[ log2SbW ][ log2SbH ][ n ][ 0 ] | |
| yC = ( yS << log2SbH ) + DiagScanOrder[ log2SbW ][ log2SbH ][ n ][ 1 ] | |
| if( AbsLevel[ xC ][ yC ] > 0 ) | |
| TransCoeffLevel[ x0 ][ y0 ][ cIdx ][ xC ][ yC ] = <br> ( 2 * AbsLevel[ xC ][ yC ] − ( QState > 1 ? 1 : 0 ) ) * <br> ( 1 − 2 * coeff_sign_flag[ n ] ) | |
| QState = QStateTransTable[ QState ][ par_level_flag[ n ] ] | |

FIG. 17

| | |
|---|---|
|     } else { | |
|       sumAbsLevel = 0 | |
|       for( n = numSbCoeff − 1; n >= 0; n− − ) { | |
|         xC = ( xS << log2SbW ) + DiagScanOrder[ log2SbW ][ log2SbH ][ n ][ 0 ] | |
|         yC = ( yS << log2SbH ) + DiagScanOrder[ log2SbW ][ log2SbH ][ n ][ 1 ] | |
|         if( AbsLevel[ xC ][ yC ] > 0 ) { | |
|           TransCoeffLevel[ x0 ][ y0 ][ cIdx ][ xC ][ yC ] = <br>            AbsLevel[ xC ][ yC ] * ( 1 − 2 * coeff_sign_flag[ n ] ) | |
|           if( signHidden ) { | |
|             sumAbsLevel += AbsLevel[ xC ][ yC ] | |
|             if( ( n == firstSigScanPosSb ) && ( sumAbsLevel % 2 ) == 1 ) ) | |
|               TransCoeffLevel[ x0 ][ y0 ][ cIdx ][ xC ][ yC ] = <br>                −TransCoeffLevel[ x0 ][ y0 ][ cIdx ][ xC ][ yC ] | |
|           } | |
|         } | |
|         } | |
|       } | |
|     } | |
| } | |

FIG. 18

| residual_coding_ts( x0, y0, log2TbWidth, log2TbHeight, cIdx ) { | Descriptor |
|---|---|
|   log2SbSize = ( Min( log2TbWidth, log2TbHeight ) < 2 ? 1 : 2 ) | |
|   numSbCoeff = 1 << ( log2SbSize << 1 ) | |
|   lastSubBlock = ( 1 << ( log2TbWidth + log2TbHeight − 2 * log2SbSize ) ) − 1 | |
|   /* Loop over subblocks from last to the top-left (DC) subblock */ | |
|   inferSbCbf = 1 | |
|   MaxCcbs = 2 * ( 1 << log2TbWidth ) * ( 1<< log2TbHeight ) | |
|   for( i =0; i <= lastSubBlock; i++ ) { | |
|     xS = DiagScanOrder[ log2TbWidth − log2SbSize ][ log2TbHeight − log2SbSize ][ i ][ 0 ] | |
|     yS = DiagScanOrder[ log2TbWidth − log2SbSize ][ log2TbHeight − log2SbSize ][ i ][ 1 ] | |
|     if( ( i != lastSubBlock  \|\|  !inferSbCbf ) | |
|       coded_sub_block_flag[ xS ][ yS ] | ae(v) |
|       MaxCcbs− − | |
|     if( coded_sub_block_flag[ xS ][ yS ] && i < lastSubBlock ) | |
|       inferSbCbf = 0 | |
|     } | |

FIG. 19

| | |
|---|---|
| /* First scan pass */ | |
| inferSbSigCoeffFlag = 1 | |
| for( n = ( i == 0; n <= numSbCoeff − 1; n++ ) { | |
|   xC = ( xS << log2SbSize ) + DiagScanOrder[ log2SbSize ][ log2SbSize ][ n ][ 0 ] | |
|   yC = ( yS << log2SbSize ) + DiagScanOrder[ log2SbSize ][ log2SbSize ][ n ][ 1 ] | |
|   if( coded_sub_block_flag[ xS ][ yS ] && | |
|     ( n == numSbCoeff − 1 \|\| !inferSbSigCoeffFlag ) ) { | |
|     sig_coeff_flag[ xC ][ yC ] | ae(v) |
|     MaxCcbs−− | |
|     if( sig_coeff_flag[ xC ][ yC ] ) | |
|       inferSbSigCoeffFlag = 0 | |
|   } | |
|   if( sig_coeff_flag[ xC ][ yC ] ) { | |
|     coeff_sign_flag[ n ] | ae(v) |
|     abs_level_gtx_flag[ n ][ 0 ] | ae(v) |
|     MaxCcbs = MaxCcbs − 2 | |
|     if( abs_level_gtx_flag[ n ][ 0 ] ) { | |
|       par_level_flag[ n ] | ae(v) |
|       MaxCcbs−− | |
|     } | |
|   } | |
|   AbsLevelPassX[ xC ][ yC ] = | |
|     sig_coeff_flag[ xC ][ yC ] + par_level_flag[ n ] + abs_level_gtx_flag[ n ][ 0 ] | |
| } | |

FIG. 20

| | |
|---|---|
| /* Greater than X scan passes (numGtXFlags=5) */ | |
| for( i = 1; i <= 5 − 1 && abs_level_gtx_flag[ n ][ i − 1 ] ; i++ ) { | |
|   for( n = 0; n <= numSbCoeff − 1; n++ ) { | |
|     xC = ( xS << log2SbSize ) + DiagScanOrder[ log2SbSize ][ log2SbSize ][ n ][ 0 ] | |
|     yC = ( yS << log2SbSize ) + DiagScanOrder[ log2SbSize ][ log2SbSize ][ n ][ 1 ] | |
|     abs_level_gtx_flag[ n ][ i ] | ae(v) |
|     MaxCcbs−− | |
|     AbsLevelPassX[ xC ][ yC ] += 2 * abs_level_gtx_flag[ n ][ i ] | |
|   } | |
| } | |
| /* remainder scan pass */ | |
| for( n = 0; n <= numSbCoeff − 1; n++ ) { | |
|   xC = ( xS << log2SbSize ) + DiagScanOrder[ log2SbSize ][ log2SbSize ][ n ][ 0 ] | |
|   yC = ( yS << log2SbSize ) + DiagScanOrder[ log2SbSize ][ log2SbSize ][ n ][ 1 ] | |
|   if( abs_level_gtx_flag[ n ][ numGtXFlags − 1 ] ) | |
|     abs_remainder[ n ] | ae(v) |
|   TransCoeffLevel[ x0 ][ y0 ][ cIdx ][ xC ][ yC ] = ( 1 − 2 * coeff_sign_flag[ n ] ) * | |
|     ( AbsLevelPassX[ xC ][ yC ] + abs_remainder[ n ] ) | |
|   } | |
|   } | |
| } | |

FIG. 22

Horizontal BDPCM

| $Q(r_{0,0})$ | $Q(r_{1,0})$ $-Q(r_{0,0})$ | ... | $Q(r_{M-2,0})$ $-Q(r_{M-3,0})$ | $Q(r_{M-1,0})$ $-Q(r_{M-2,0})$ |
| --- | --- | --- | --- | --- |
| $Q(r_{0,1})$ | $Q(r_{1,1})$ $-Q(r_{0,1})$ | ... | $Q(r_{M-2,1})$ $-Q(r_{M-3,1})$ | $Q(r_{M-1,1})$ $-Q(r_{M-2,1})$ |
| ... | ... | ... | ... | ... |
| $Q(r_{0,N-2})$ | $Q(r_{1,N-2})$ $-Q(r_{0,N-2})$ | ... | $Q(r_{M-2,N-2})$ $-Q(r_{M-3,N-2})$ | $Q(r_{M-1,N-2})$ $-Q(r_{M-2,N-2})$ |
| $Q(r_{0,N-1})$ | $Q(r_{1,N-1})$ $-Q(r_{0,N-1})$ | ... | $Q(r_{M-2,N-1})$ $-Q(r_{M-3,N-1})$ | $Q(r_{M-1,N-1})$ $-Q(r_{M-2,N-1})$ |

Vertical BDPCM

| $Q(r_{0,0})$ | $Q(r_{1,0})$ | ... | $Q(r_{M-2,0})$ | $Q(r_{M-1,0})$ |
| --- | --- | --- | --- | --- |
| $Q(r_{0,1})$ $-Q(r_{0,0})$ | $Q(r_{1,1})$ $-Q(r_{1,0})$ | ... | $Q(r_{M-2,1})$ $-Q(r_{M-2,0})$ | $Q(r_{M-1,1})$ $-Q(r_{M-1,0})$ |
| ... | ... | ... | ... | ... |
| $Q(r_{0,N-2})$ $-Q(r_{0,N-3})$ | $Q(r_{1,N-2})$ $-Q(r_{1,N-3})$ | ... | $Q(r_{M-2,N-2})$ $-Q(r_{M-2,N-3})$ | $Q(r_{M-1,N-2})$ $-Q(r_{M-1,N-3})$ |
| $Q(r_{0,N-1})$ $-Q(r_{0,N-2})$ | $Q(r_{1,N-1})$ $-Q(r_{1,N-2})$ | ... | $Q(r_{M-2,N-1})$ $-Q(r_{M-2,N-2})$ | $Q(r_{M-1,N-1})$ $-Q(r_{M-1,N-2})$ |

| if( CuPredMode[ x0 ][ y0 ]  ==  MODE_INTRA ) { | |
|---|---|
| if( pred_mode_flag  ==  MODE_INTRA &&  ( cIdx == 0  )  && ( cbWidth <= 32 )  &&  ( CbHeight <= 32 )) { | |
| bdpcm_flag[ x0 ][ y0 ] | ae(v) |
| if( bdpcm_flag[ x0 ][ y0 ] ) { | |
| bdpcm_dir_flag[ x0 ][ y0 ] | ae(v) |

FIG. 27

| 5 | 5 | 5 | 5 | 7 | 7 | 7 | 7 | 9 | 9 | 9 | 9 | 9 | 9 | 9 | 9 |
|---|---|---|---|---|---|---|---|---|---|---|---|---|---|---|---|
| 5 | 5 | 5 | 5 | 7 | 7 | 7 | 7 | 9 | 9 | 9 | 9 | 9 | 9 | 9 | 9 |
| 5 | 5 | 5 | 5 | 7 | 7 | 7 | 7 | 9 | 9 | 9 | 9 | 9 | 9 | 9 | 9 |
| 5 | 5 | 5 | 5 | 7 | 7 | 7 | 7 | 9 | 9 | 9 | 9 | 9 | 9 | 9 | 9 |
| 5 | 5 | 5 | 5 | 7 | 7 | 7 | 7 | 9 | 9 | 9 | 9 | 9 | 9 | 9 | 9 |
| 5 | 5 | 5 | 5 | 7 | 7 | 7 | 7 | 9 | 9 | 9 | 9 | 9 | 9 | 9 | 9 |
| 5 | 5 | 5 | 5 | 7 | 7 | 7 | 7 | 9 | 9 | 9 | 9 | 9 | 9 | 9 | 9 |
| 5 | 5 | 5 | 5 | 7 | 7 | 7 | 7 | 9 | 9 | 9 | 9 | 9 | 9 | 9 | 9 |
| 5 | 5 | 5 | 5 | 7 | 7 | 7 | 7 | 9 | 9 | 9 | 9 | 9 | 9 | 9 | 9 |
| 5 | 5 | 5 | 5 | 7 | 7 | 7 | 7 | 9 | 9 | 9 | 9 | 9 | 9 | 9 | 9 |
| 5 | 5 | 5 | 5 | 7 | 7 | 7 | 7 | 9 | 9 | 9 | 9 | 9 | 9 | 9 | 9 |
| 5 | 5 | 5 | 5 | 7 | 7 | 7 | 7 | 9 | 9 | 9 | 9 | 9 | 9 | 9 | 9 |
| 5 | 5 | 5 | 5 | 7 | 7 | 7 | 7 | 9 | 9 | 9 | 9 | 9 | 9 | 9 | 9 |
| 5 | 5 | 5 | 5 | 7 | 7 | 7 | 7 | 9 | 9 | 9 | 9 | 9 | 9 | 9 | 9 |
| 5 | 5 | 5 | 5 | 7 | 7 | 7 | 7 | 9 | 9 | 9 | 9 | 9 | 9 | 9 | 9 |
| 5 | 5 | 5 | 5 | 7 | 7 | 7 | 7 | 9 | 9 | 9 | 9 | 9 | 9 | 9 | 9 |

FIG. 28

| 5 | 0 | 0 | 0 | 2 | 0 | 0 | 0 | 2 | 0 | 0 | 0 | 0 | 0 | 0 | 0 |
|---|---|---|---|---|---|---|---|---|---|---|---|---|---|---|---|
| 5 | 0 | 0 | 0 | 2 | 0 | 0 | 0 | 2 | 0 | 0 | 0 | 0 | 0 | 0 | 0 |
| 5 | 0 | 0 | 0 | 2 | 0 | 0 | 0 | 2 | 0 | 0 | 0 | 0 | 0 | 0 | 0 |
| 5 | 0 | 0 | 0 | 2 | 0 | 0 | 0 | 2 | 0 | 0 | 0 | 0 | 0 | 0 | 0 |
| 5 | 0 | 0 | 0 | 2 | 0 | 0 | 0 | 2 | 0 | 0 | 0 | 0 | 0 | 0 | 0 |
| 5 | 0 | 0 | 0 | 2 | 0 | 0 | 0 | 2 | 0 | 0 | 0 | 0 | 0 | 0 | 0 |
| 5 | 0 | 0 | 0 | 2 | 0 | 0 | 0 | 2 | 0 | 0 | 0 | 0 | 0 | 0 | 0 |
| 5 | 0 | 0 | 0 | 2 | 0 | 0 | 0 | 2 | 0 | 0 | 0 | 0 | 0 | 0 | 0 |
| 5 | 0 | 0 | 0 | 2 | 0 | 0 | 0 | 2 | 0 | 0 | 0 | 0 | 0 | 0 | 0 |
| 5 | 0 | 0 | 0 | 2 | 0 | 0 | 0 | 2 | 0 | 0 | 0 | 0 | 0 | 0 | 0 |
| 5 | 0 | 0 | 0 | 2 | 0 | 0 | 0 | 2 | 0 | 0 | 0 | 0 | 0 | 0 | 0 |
| 5 | 0 | 0 | 0 | 2 | 0 | 0 | 0 | 2 | 0 | 0 | 0 | 0 | 0 | 0 | 0 |
| 5 | 0 | 0 | 0 | 2 | 0 | 0 | 0 | 2 | 0 | 0 | 0 | 0 | 0 | 0 | 0 |
| 5 | 0 | 0 | 0 | 2 | 0 | 0 | 0 | 2 | 0 | 0 | 0 | 0 | 0 | 0 | 0 |
| 5 | 0 | 0 | 0 | 2 | 0 | 0 | 0 | 2 | 0 | 0 | 0 | 0 | 0 | 0 | 0 |
| 5 | 0 | 0 | 0 | 2 | 0 | 0 | 0 | 2 | 0 | 0 | 0 | 0 | 0 | 0 | 0 |

| | | | | | | | | | | | | | | | |
|---|---|---|---|---|---|---|---|---|---|---|---|---|---|---|---|
| 5 | 0 | 0 | 0 | 2 | 0 | 0 | 0 | 2 | 0 | 0 | 0 | 0 | 0 | 0 | 0 |
| 5 | 0 | 0 | 0 | 2 | 0 | 0 | 0 | 2 | 0 | 0 | 0 | 0 | 0 | 0 | 0 |
| 5 | 0 | 0 | 0 | 2 | 0 | 0 | 0 | 2 | 0 | 0 | 0 | 0 | 0 | 0 | 0 |
| 5 | 0 | 0 | 0 | 2 | 0 | 0 | 0 | 2 | 0 | 0 | 0 | 0 | 0 | 0 | 0 |
| 5 | 0 | 0 | 0 | 2 | 0 | 0 | 0 | 2 | 0 | 0 | 0 | 0 | 0 | 0 | 0 |
| 5 | 0 | 0 | 0 | 2 | 0 | 0 | 0 | 2 | 0 | 0 | 0 | 0 | 0 | 0 | 0 |
| 5 | 0 | 0 | 0 | 2 | 0 | 0 | 0 | 2 | 0 | 0 | 0 | 0 | 0 | 0 | 0 |
| 5 | 0 | 0 | 0 | 2 | 0 | 0 | 0 | 2 | 0 | 0 | 0 | 0 | 0 | 0 | 0 |
| 5 | 0 | 0 | 0 | 2 | 0 | 0 | 0 | 2 | 0 | 0 | 0 | 0 | 0 | 0 | 0 |
| 5 | 0 | 0 | 0 | 2 | 0 | 0 | 0 | 2 | 0 | 0 | 0 | 0 | 0 | 0 | 0 |
| 5 | 0 | 0 | 0 | 2 | 0 | 0 | 0 | 2 | 0 | 0 | 0 | 0 | 0 | 0 | 0 |
| 5 | 0 | 0 | 0 | 2 | 0 | 0 | 0 | 2 | 0 | 0 | 0 | 0 | 0 | 0 | 0 |
| 5 | 0 | 0 | 0 | 2 | 0 | 0 | 0 | 2 | 0 | 0 | 0 | 0 | 0 | 0 | 0 |
| 5 | 0 | 0 | 0 | 2 | 0 | 0 | 0 | 2 | 0 | 0 | 0 | 0 | 0 | 0 | 0 |
| 5 | 0 | 0 | 0 | 2 | 0 | 0 | 0 | 2 | 0 | 0 | 0 | 0 | 0 | 0 | 0 |
| 5 | 0 | 0 | 0 | 2 | 0 | 0 | 0 | 2 | 0 | 0 | 0 | 0 | 0 | 0 | 0 |

METHOD AND DEVICE FOR CODING/DECODING IMAGE USING DIFFERENTIAL CODING OF RESIDUAL COEFFICIENT, AND METHOD FOR TRANSMITTING BITSTREAM

CROSS-REFERENCE TO RELATED APPLICATION

This application is the National Stage filing under 35 U.S.C. 371 of International Application No. PCT/KR2020/005047, filed Apr. 14, 2020, which claims the benefit of U.S. Provisional Application No. 62/834,953, filed Apr. 16, 2019, the contents of which are all hereby incorporated by reference herein in their entirety.

TECHNICAL FIELD

The present disclosure relates to an image encoding/decoding method and apparatus, and a method of transmitting a bitstream, and, more particularly, to a method and apparatus for encoding/decoding an image using differential encoding of a residual coefficient, and a method of transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

In addition, another object of the present disclosure is to provide a method and apparatus for encoding/decoding an image using differential encoding of a residual coefficient.

In addition, another object of the present disclosure is to provide an image encoding/decoding method apparatus for splitting a residual coefficient subblock according to a differential encoding direction of a residual coefficient.

In addition, another object of the present disclosure is to provide an image encoding/decoding method apparatus for determining a scan order of residual coefficient subblocks according to a differential encoding direction of a residual coefficient.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

An image decoding method performed by an image decoding apparatus according to an aspect of the present disclosure may include obtaining a residual block of a current block encoded in an intra prediction mode from a bitstream, deriving a modified residual block by performing differential encoding with respect to the residual block, based on differential encoding mode information obtained from the bitstream indicating a differential encoding mode of a residual coefficient, and deriving a residual block of the current block by performing dequantization with respect to the modified residual block.

The deriving the modified residual block may include modifying at least one residual coefficient to be modified among residual coefficients in the residual block, the modifying may be performed using the residual coefficient to be modified and a prediction residual coefficient, and the prediction residual coefficient may be determined based on a prediction direction specified by differential encoding direction information obtained from the bitstream.

The modifying may include adding the residual coefficient to be modified and the prediction residual coefficient and assigning the added value to a position of the residual coefficient to be modified, and the prediction residual coefficient is adjacent to immediately before the residual coefficient to be modified in an order according to the prediction direction. The prediction direction may be any one of a vertical direction and a horizontal direction.

The obtaining the residual block from the bitstream may include splitting the current block into at least one residual coefficient subblocks based on a prediction direction specified by differential encoding direction information obtained from the bitstream, and obtaining a residual coefficient included in each of the at least one residual coefficient subblocks from the bitstream. A size of the residual coefficient subblock may be determined based on the prediction direction.

A width value of the residual coefficient subblock may be determined to be equal to or greater than a height value, based on that the prediction direction is a vertical direction, and a height value of the residual coefficient subblock may be determined to be equal to or greater than a width value, based on that the prediction direction is a horizontal direction.

Based on that the prediction direction is a horizontal direction and a pixel unit height of the current block is a positive integer N of 16 or less, a width of the residual coefficient subblock may be determined to be N, and a height of the residual coefficient subblock may be determined to be 16/N.

Based on that the prediction direction is a vertical direction and a pixel unit width of the current block is a positive integer N of 16 or less, a width of the residual coefficient subblock may be determined to be N, and a height of the residual coefficient subblock may be determined to be 16/N.

In addition, a height value of the residual coefficient subblock may be determined to be equal to or greater than a width value, based on that the prediction direction is a vertical direction, and a width value of the residual coefficient subblock may be determined to be equal to or greater than a height value, based on that the prediction direction is a horizontal direction.

Based on that the prediction direction is a horizontal direction and a pixel unit width of the current block is a positive integer N of 16 or less, a width of the residual coefficient subblock may be determined to be N, and a height of the residual coefficient subblock may be determined to be 16/N.

Based on that the prediction direction is a vertical direction and a pixel unit height of the current block is a positive integer N of 16 or less, a height of the residual coefficient subblock may be determined to be N, and a width of the residual coefficient subblock may be determined to be 16/N.

The obtaining the residual block from the bitstream may include splitting the current block into at least one residual coefficient subblocks and obtaining residual coefficients included in each of the at least one residual coefficient subblocks from the bitstream according to a predetermined scan order of the residual coefficient subblocks, and the predetermined scan order may be determined based on a prediction direction specified by differential encoding direction information obtained from the bitstream.

The predetermined scan order may be a vertical scan order, based on that the prediction direction is a horizontal direction, and the predetermined scan order may be a horizontal scan order, based on that the prediction direction is a vertical direction.

The predetermined scan order may be a horizontal scan order, based on that the prediction direction is a horizontal direction, and the predetermined scan order may be a vertical scan order, based on that the prediction direction is a vertical direction.

The obtaining the residual block from the bitstream may include splitting the current block into at least one residual coefficient subblocks and obtaining residual coefficients included in each of the at least one residual coefficient subblocks from the bitstream according to a predetermined scan order of the residual coefficients in the residual coefficient subblocks, and the predetermined scan order may be determined based on a prediction direction specified by differential encoding direction information obtained from the bitstream.

An image decoding apparatus according to an aspect of the present disclosure may include a memory and at least one processor. The at least one processor may include obtain a residual block of a current block encoded in an intra prediction mode from a bitstream, derive a modified residual block by performing differential encoding with respect to the residual block, based on differential encoding mode information obtained from the bitstream indicating a differential encoding mode of a residual coefficient, and derive a residual block of the current block by performing dequantization with respect to the modified residual block.

An image encoding method performed by an image encoding apparatus according to an aspect of the present disclosure may include deriving a residual block of a current block predicted in an intra prediction mode, deriving a residual block by quantizing the residual block, deriving a modified residual block by performing differential encoding with respect to the residual block, based on that a differential encoding mode of residual coefficients is performed with respect to the current block, and generating a bitstream by encoding differential encoding mode information specifying a differential encoding mode of residual coefficients and the modified residual block.

In addition, a transmission method according to another aspect of the present disclosure may transmit a bitstream generated by the image encoding apparatus or the image encoding method of the present disclosure.

In addition, a computer-readable recording medium according to another aspect of the present disclosure may store the bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

In addition, according to the present disclosure, it is possible to provide a method and apparatus for encoding/decoding an image using differential encoding of a residual coefficient.

In addition, according to the present disclosure, it is possible to provide an image encoding/decoding method apparatus capable of splitting a residual coefficient subblock according to a differential encoding direction of a residual coefficient.

In addition, according to the present disclosure, it is possible to provide an image encoding/decoding method apparatus capable of determining a scan order of residual coefficient subblocks according to a differential encoding direction of a residual coefficient.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIG. 4 is a view showing a partitioning structure of an image according to an embodiment.

FIG. 5 is a view showing an embodiment of a splitting type of a block according to a multi-type tree structure.

FIG. 11 is a view illustrating intra sub-partitions (ISP) among intra prediction techniques.

FIG. 12 is a view illustrating a structure of a bitstream of intra prediction information.

FIGS. 14 to 17 are views illustrating a residual signal bitstream structure when applying encoding of a residual sample.

FIGS. 18 to 20 are views illustrating an embodiment of a residual signal bitstream structure when applying a transform skip mode to a current block.

FIG. 22 is a view illustrating a modified quantized residual block generated by performing BDPCM according to an embodiment.

FIG. 27 is a view illustrating a residual coefficient sub-block having a size of 16×16 according to an embodiment.

FIG. 28 is a view illustrating an example of applying horizontal BDPCM according to an embodiment.

FIG. 31 is a view illustrating a residual coefficient sub-block determined for a current block to which horizontal DBPCM according to an embodiment applies.

MODE FOR INVENTION

Figure 1:
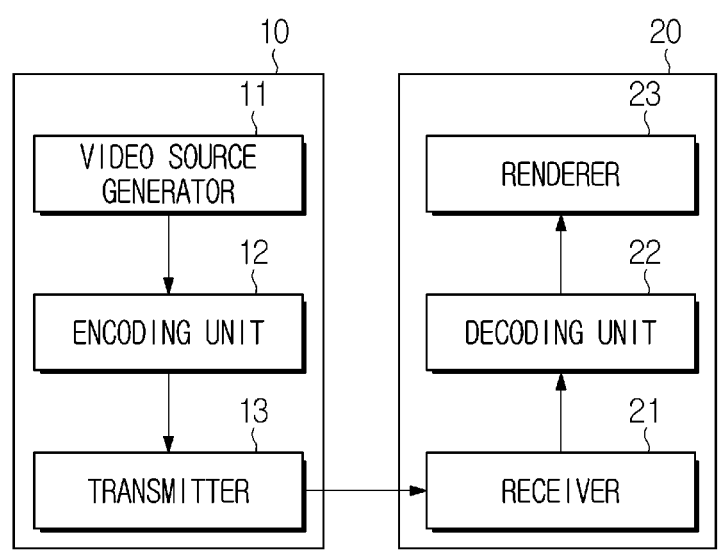
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean "a luma block of a current block" unless explicitly stated as a chroma block. The "chroma block of the current block" may be expressed by including an explicit description of a chroma block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system according to the present disclosure.

The video coding system according to an embodiment may include a encoding apparatus 10 and a decoding apparatus 20. The image encoding apparatus 10 may deliver encoded video and/or image information or data to the image decoding apparatus 20 in the form of a file or streaming via a digital storage medium or network.

The image encoding apparatus 10 according to an embodiment may include a video source generator 11, an encoding unit 12 and a transmitter 13. The image decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the image decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
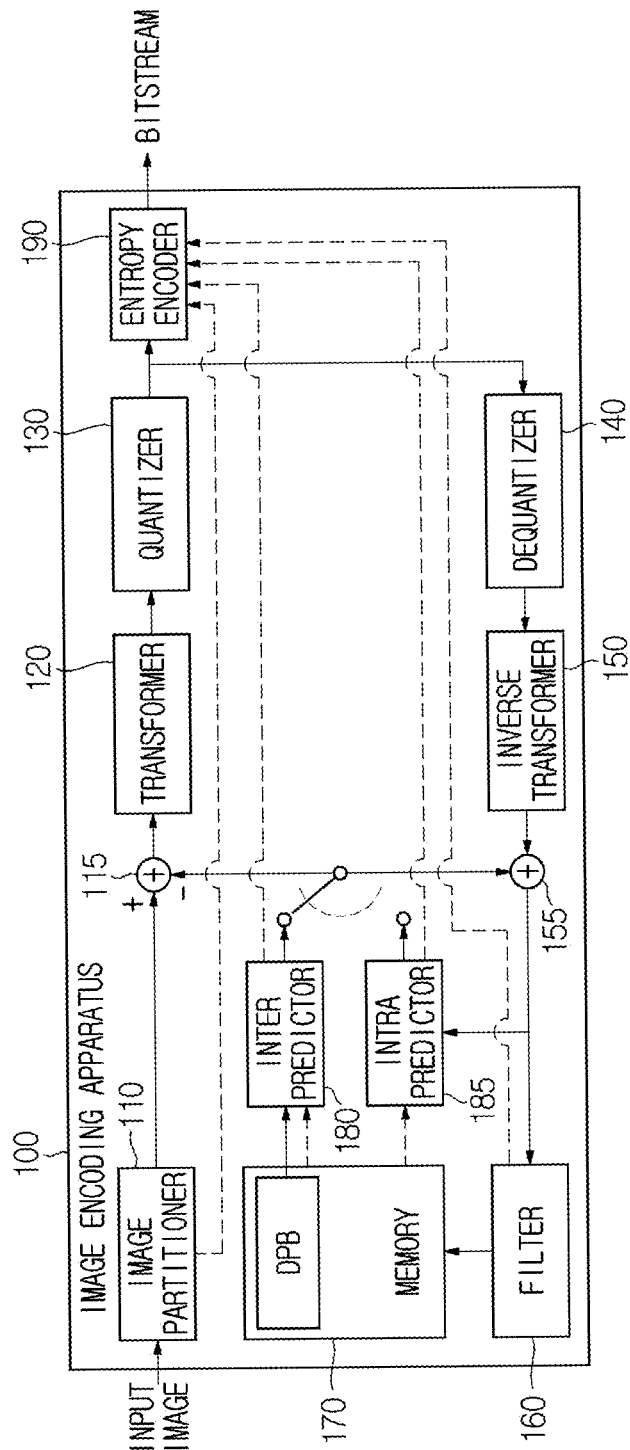
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loeve transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block form into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
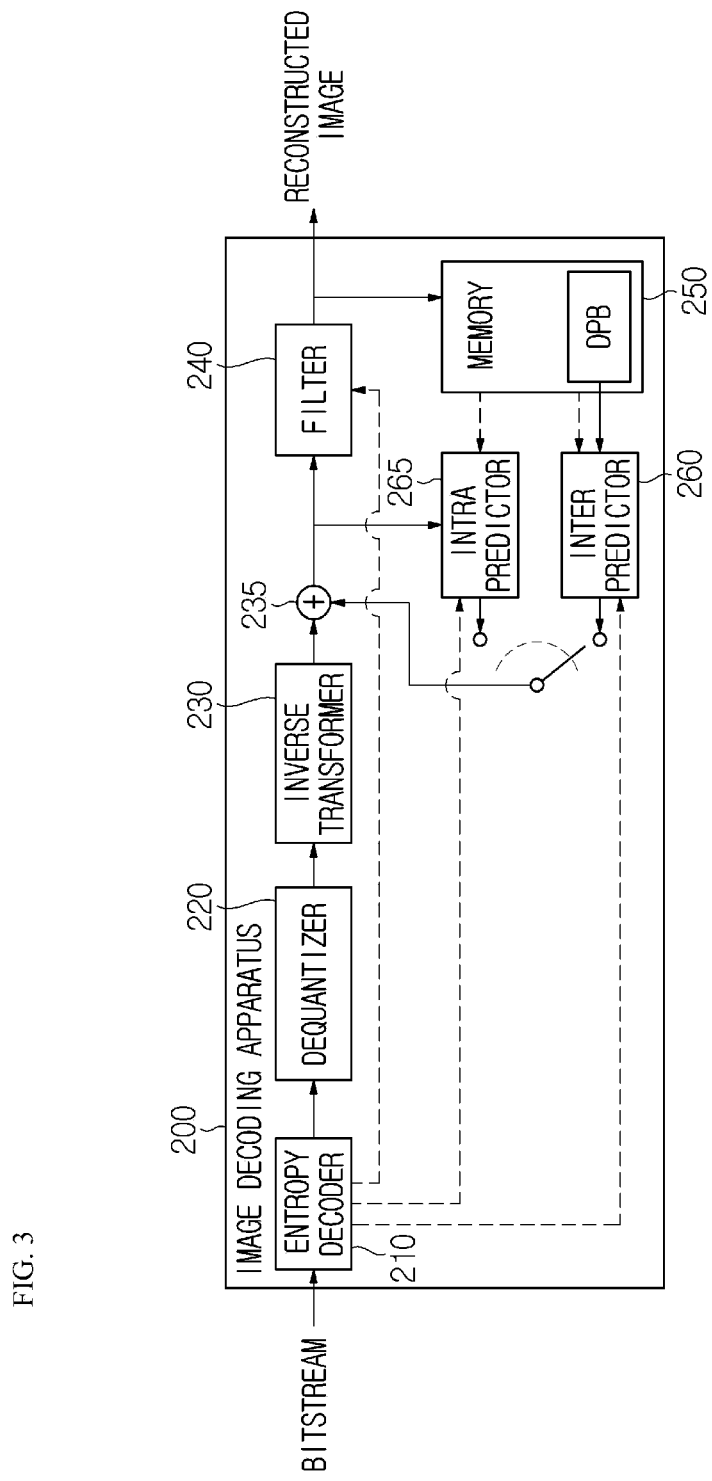
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 260 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 265 may predict the current block by referring to the samples in the current picture. The description of the intra prediction unit 185 is equally applied to the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter prediction unit 260, and the intra prediction unit 265 of the image decoding apparatus 200.

Overview of Image Partitioning

The video/image coding method according to the present disclosure may be performed based on an image partitioning structure as follows. Specifically, the procedures of prediction, residual processing ((inverse) transform, (de)quantization, etc.), syntax element coding, and filtering, which will be described later, may be performed based on a CTU, CU (and/or TU, PU) derived based on the image partitioning structure. The image may be partitioned in block units and the block partitioning procedure may be performed in the image partitioner 110 of the encoding apparatus. The partitioning related information may be encoded by the entropy encoder 190 and transmitted to the image decoding apparatus in the form of a bitstream. The entropy decoder 210 of the image decoding apparatus may derive a block partitioning structure of the current picture based on the partitioning related information obtained from the bitstream, and based on this, may perform a series of procedures (e.g., prediction, residual processing, block/picture reconstruction, in-loop filtering, etc.) for image decoding.

Pictures may be partitioned into a sequence of coding tree units (CTUs). FIG. 4 shows an example in which a picture is partitioned into CTUs. The CTU may correspond to a coding tree block (CTB). Alternatively, the CTU may include a coding tree block of luma samples and two coding tree blocks of corresponding chroma samples. For example, for a picture that contains three sample arrays, the CTU may include an N×N block of luma samples and two corresponding blocks of chroma samples.

Overview of Partitioning of CTU

As described above, the coding unit may be acquired by recursively partitioning the coding tree unit (CTU) or the largest coding unit (LCU) according to a quad-tree/binary-tree/ternary-tree (QT/BT/TT) structure. For example, the CTU may be first partitioned into quadtree structures. Thereafter, leaf nodes of the quadtree structure may be further partitioned by a multi-type tree structure.

Partitioning according to quadtree means that a current CU (or CTU) is partitioned into equally four. By partitioning according to quadtree, the current CU may be partitioned into four CUs having the same width and the same height. When the current CU is no longer partitioned into the quadtree structure, the current CU corresponds to the leaf node of the quad-tree structure. The CU corresponding to the leaf node of the quadtree structure may be no longer partitioned and may be used as the above-described final coding unit. Alternatively, the CU corresponding to the leaf node of the quadtree structure may be further partitioned by a multi-type tree structure.

FIG. 5 is a view showing an embodiment of a splitting type of a block according to a multi-type tree structure. Splitting according to the multi-type tree structure may include two types of splitting according to a binary tree structure and two types of splitting according to a ternary tree structure.

The two types of splitting according to the binary tree structure may include vertical binary splitting (SPLIT_BT_VER) and horizontal binary splitting (SPLIT_BT_HOR). Vertical binary splitting (SPLIT_BT_VER) means that the current CU is split into equally two in the vertical direction. As shown in FIG. 4, by vertical binary splitting, two CUs having the same height as the current CU and having a width which is half the width of the current CU may be generated. Horizontal binary splitting (SPLIT_BT_HOR) means that the current CU is split into equally two in the horizontal direction. As shown in FIG. 5, by horizontal binary splitting, two CUs having a height which is half the height of the current CU and having the same width as the current CU may be generated.

Two types of splitting according to the ternary tree structure may include vertical ternary splitting (SPLIT_TT_VER) and horizontal ternary splitting (SPLIT_TT_HOR). In vertical ternary splitting (SPLIT_TT_VER), the current CU is split in the vertical direction at a ratio of 1:2:1. As shown in FIG. 5, by vertical ternary splitting, two CUs having the same height as the current CU and having a width which is ¼ of the width of the current CU and a CU having the same height as the current CU and having a width which is half the width of the current CU may be generated. In horizontal ternary splitting (SPLIT_TT_HOR), the current CU is split in the horizontal direction at a ratio of 1:2:1. As shown in FIG. 5, by horizontal ternary splitting, two CUs having a height which is ¼ of the height of the current CU and having the same width as the current CU and a CU having a height which is half the height of the current CU and having the same width as the current CU may be generated.

Figure 6:
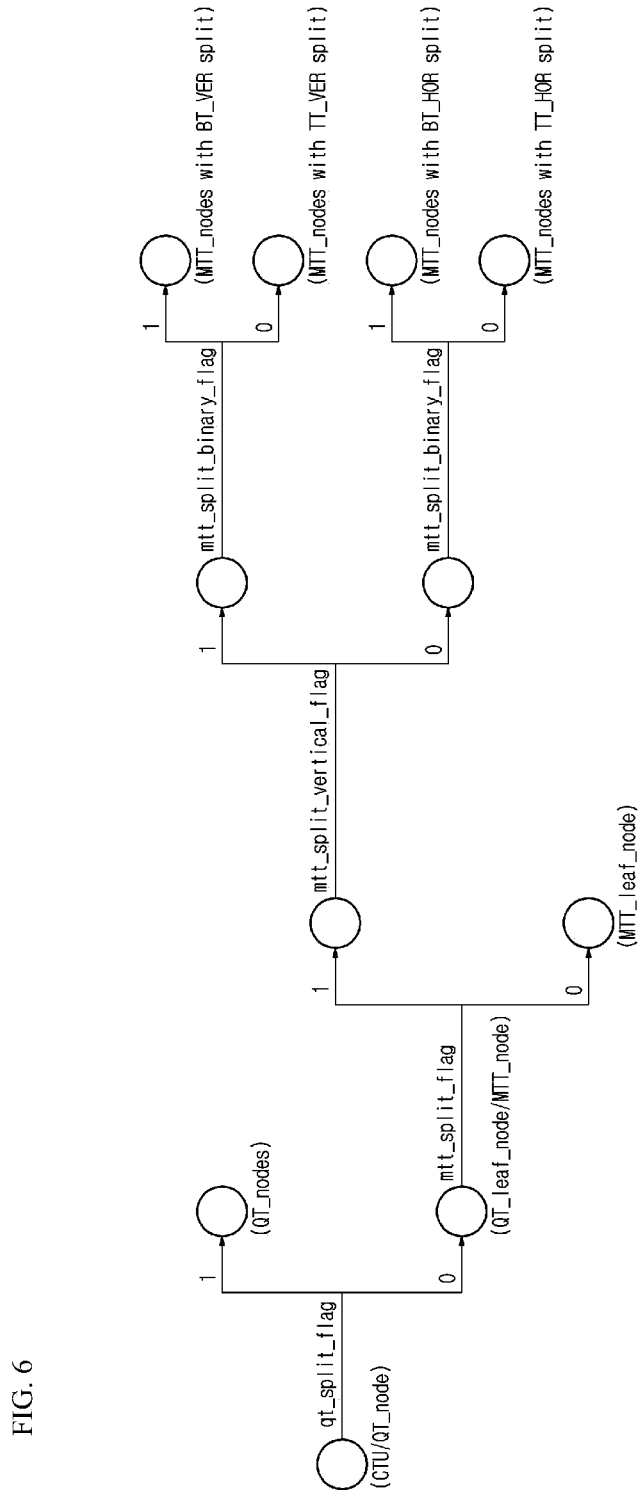
FIG. 6 is a view showing a signaling mechanism of block splitting information in a quadtree with nested multi-type tree structure according to the present disclosure.

FIG. 6 is a view showing a signaling mechanism of block splitting information in a quadtree with nested multi-type tree structure according to the present disclosure.

Here, the CTU is treated as the root node of the quadtree, and is partitioned for the first time into a quadtree structure. Information (e.g., qt_split_flag) indicating whether quadtree splitting is performed with respect to the current CU (CTU or node (QT_node) of the quadtree) is signaled. For example, when qt_split_flag has a first value (e.g., "1"), the current CU may be quadtree-partitioned. In addition, when qt_split_flag has a second value (e.g., "0"), the current CU is not quadtree-partitioned, but becomes the leaf node (QT_leaf node) of the quadtree. Each quadtree leaf node may then be further partitioned into multitype tree structures. That is, the leaf node of the quadtree may become the node (MTT_node) of the multi-type tree. In the multitype tree structure, a first flag (e.g., Mtt_split_cu_flag) is signaled to indicate whether the current node is additionally partitioned. If the corresponding node is additionally partitioned (e.g., if the first flag is 1), a second flag (e.g., Mtt_split_cu_vertical_flag) may be signaled to indicate the splitting direction. For example, the splitting direction may be a vertical direction if the second flag is 1 and may be a horizontal direction if the second flag is 0. Then, a third flag (e.g., Mtt_split_cu_binary_flag) may be signaled to indicate whether the split type is a binary split type or a ternary split type. For example, the split type may be a binary split type when the third flag is 1 and may be a ternary split type when the third flag is 0. The node of the multi-type tree acquired by binary splitting or ternary splitting may be further partitioned into multi-type tree structures. However, the node of the multi-type tree may not be partitioned into quadtree structures. If the first flag is 0, the corresponding node of the multi-type tree is no longer split but becomes the leaf node (MTT_leaf_node) of the multi-type tree. The CU corresponding to the leaf node of the multi-type tree may be used as the above-described final coding unit.

Based on the mtt_split_cu_vertical_flag and the mtt_split_cu_binary_flag, a multi-type tree splitting mode (MttSplitMode) of a CU may be derived as shown in Table 1 below. In the following description, the multi-type tree splitting mode may be referred to as a multi-tree splitting type or splitting type.

TABLE 1

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

Figure 7:
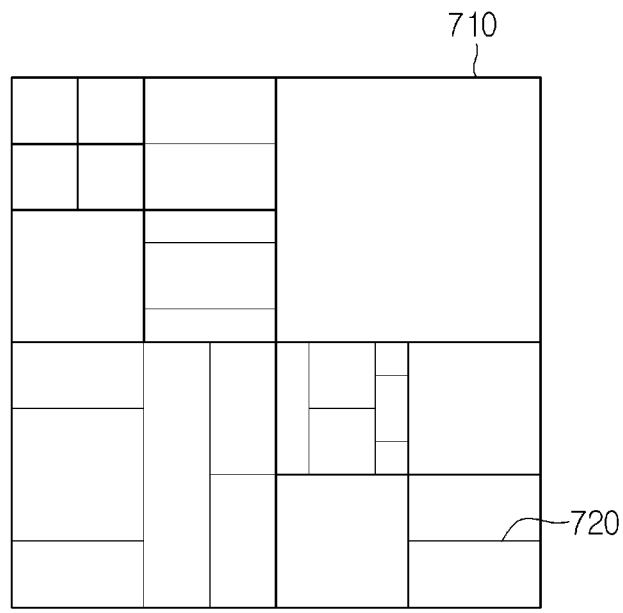
FIG. 7 is a view showing an embodiment in which a CTU is partitioned into multiple CUs.

FIG. 7 is a view showing an example in which a CTU is partitioned into multiple CUs by applying a multi-type tree after applying a quadtree. In FIG. 7, bold block edges 710 represent quadtree partitioning and the remaining edges 720 represent multitype tree partitioning.

The CU may correspond to a coding block (CB). In an embodiment, the CU may include a coding block of luma samples and two coding blocks of chroma samples corresponding to the luma samples.

A chroma component (sample) CB or TB size may be derived based on a luma component (sample) CB or TB size according to the component ratio according to the color format (chroma format, e.g., 4:4:4, 4:2:2, 4:2:0 or the like) of the picture/image. In case of 4:4:4 color format, the chroma component CB/TB size may be set equal to be luma component CB/TB size. In case of 4:2:2 color format, the width of the chroma component CB/TB may be set to half the width of the luma component CB/TB and the height of the chroma component CB/TB may be set to the height of the luma component CB/TB. In case of 4:2:0 color format, the width of the chroma component CB/TB may be set to half the width of the luma component CB/TB and the height of the chroma component CB/TB may be set to half the height of the luma component CB/TB.

In an embodiment, when the size of the CTU is 128 based on the luma sample unit, the size of the CU may have a size from 128×128 to 4×4 which is the same size as the CTU. In one embodiment, in case of 4:2:0 color format (or chroma format), a chroma CB size may have a size from 64×64 to 2×2.

Meanwhile, in an embodiment, the CU size and the TU size may be the same. Alternatively, there may be a plurality of TUs in a CU region. The TU size generally represents a luma component (sample) transform block (TB) size.

The TU size may be derived based a largest allowable TB size maxTbSize which is a predetermined value. For example, when the CU size is greater than maxTbSize, a plurality of TUs (TBs) having maxTbSize may be derived from the CU and transform/inverse transform may be performed in units of TU (TB). For example, the largest allowable luma TB size may be 64×64 and the largest allowable chroma TB size may be 32×32. If the width or height of the CB partitioned according to the tree structure is larger than the largest transform width or height, the CB may be automatically (or implicitly) partitioned until the TB size limit in the horizontal and vertical directions is satisfied.

In addition, for example, when intra prediction is applied, an intra prediction mode/type may be derived in units of CU (or CB) and a neighboring reference sample derivation and prediction sample generation procedure may be performed in units of TU (or TB). In this case, there may be one or a plurality of TUs (or TBs) in one CU (or CB) region and, in this case, the plurality of TUs or (TBs) may share the same intra prediction mode/type.

Meanwhile, for a quadtree coding tree scheme with nested multitype tree, the following parameters may be signaled as SPS syntax elements from the image encoding apparatus to the decoding apparatus. For example, at least one of a CTU size which is a parameter representing the root node size of a quadtree, MinQTSize which is a parameter representing the minimum allowed quadtree leaf node size, MaxBtSize which is a parameter representing the maximum allowed binary tree root node size, MaxTtSize which is a parameter representing the maximum allowed ternary tree root node size, MaxMttDepth which is a parameter representing the maximum allowed hierarchy depth of multi-type tree splitting from a quadtree leaf node, MinBtSize which is a parameter representing the minimum allowed binary tree leaf node size, or MinTtSize which is a parameter representing the minimum allowed ternary tree leaf node size is signaled.

As an embodiment of using 4:2:0 chroma format, the CTU size may be set to 128×128 luma blocks and two 64×64 chroma blocks corresponding to the luma blocks. In this case, MinOTSize may be set to 16×16, MaxBtSize may be set to 128×128, MaxTtszie may be set to 64×64, MinBtSize and MinTtSize may be set to 4×4, and MaxMttDepth may be set to 4. Quadtree partitioning may be applied to the CTU to generate quadtree leaf nodes. The quadtree leaf node may be called a leaf QT node. Quadtree leaf nodes may have a size from a 16×16 size (e.g., the MinOTSize) to a 128×128 size (e.g., the CTU size). If the leaf QT node is 128×128, it may not be additionally partitioned into a binary tree/ternary tree. This is because, in this case, even if partitioned, it exceeds MaxBtsize and MaxTtszie (e.g., 64×64). In other cases, leaf QT nodes may be further partitioned into a multitype tree. Therefore, the leaf QT node is the root node for the multitype tree, and the leaf QT node may have a multitype tree depth (mttDepth) 0 value. If the multitype tree depth reaches MaxMttdepth (e.g., 4), further partitioning may not be considered further. If the width of the multitype tree node is equal to MinBtSize and less than or equal to 2×MinTtSize, then no further horizontal partitioning may be considered. If the height of the multitype tree node is equal to MinBtSize and less than or equal to 2×MinTtSize, no further vertical partitioning may be considered. When partitioning is not considered, the image encoding apparatus may skip signaling of partitioning information. In this case, the image decoding apparatus may derive partitioning information with a predetermined value.

Meanwhile, one CTU may include a coding block of luma samples (hereinafter referred to as a "luma block") and two coding blocks of chroma samples corresponding thereto (hereinafter referred to as "chroma blocks"). The above-described coding tree scheme may be equally or separately applied to the luma block and chroma block of the current CU. Specifically, the luma and chroma blocks in one CTU may be partitioned into the same block tree structure and, in this case, the tree structure is represented as SINGLE_TREE. Alternatively, the luma and chroma blocks in one CTU may be partitioned into separate block tree structures, and, in this case, the tree structure may be represented as DUAL_TREE. That is, when the CTU is partitioned into dual trees, the block tree structure for the luma block and the block tree structure for the chroma block may be separately present. In this case, the block tree structure for the luma block may be called DUAL_TREE_LUMA, and the block tree structure for the chroma component may be called DUAL_TREE_CHROMA. For P and B slice/tile groups, luma and chroma blocks in one CTU may be limited to have the same coding tree structure.

However, for I slice/tile groups, luma and chroma blocks may have a separate block tree structure from each other. If the separate block tree structure is applied, the luma CTB may be partitioned into CUs based on a particular coding tree structure, and the chroma CTB may be partitioned into chroma CUs based on another coding tree structure. That is, this means that a CU in an I slice/tile group, to which the separate block tree structure is applied, may include a coding block of luma components or coding blocks of two chroma components and a CU of a P or B slice/tile group may include blocks of three color components (a luma component and two chroma components).

Although a quadtree coding tree structure with a nested multitype tree has been described, a structure in which a CU is partitioned is not limited thereto. For example, the BT structure and the TT structure may be interpreted as a concept included in a multiple partitioning tree (MPT) structure, and the CU may be interpreted as being partitioned through the QT structure and the MPT structure. In an example where the CU is partitioned through a QT structure and an MPT structure, a syntax element (e.g., MPT_split_type) including information on how many blocks the leaf node of the QT structure is partitioned into and a syntax element (ex. MPT_split_mode) including information on which of vertical and horizontal directions the leaf node of the QT structure is partitioned into may be signaled to determine a partitioning structure.

In another example, the CU may be partitioned in a different way than the QT structure, BT structure or TT structure. That is, unlike that the CU of the lower depth is partitioned into ¼ of the CU of the higher depth according to the QT structure, the CU of the lower depth is partitioned into ½ of the CU of the higher depth according to the BT structure, or the CU of the lower depth is partitioned into ¼ or ½ of the CU of the higher depth according to the TT structure, the CU of the lower depth may be partitioned into ⅕, ⅓, ⅜, ⅗, ⅔, or ⅝ of the CU of the higher depth in some cases, and the method of partitioning the CU is not limited thereto.

The quadtree coding block structure with the multi-type tree may provide a very flexible block partitioning structure. Because of the partition types supported in a multi-type tree, different partition patterns may potentially result in the same coding block structure in some cases. In the image encoding apparatus and the decoding apparatus, by limiting the occurrence of such redundant partition patterns, a data amount of partitioning information may be reduced.

Figure 8:
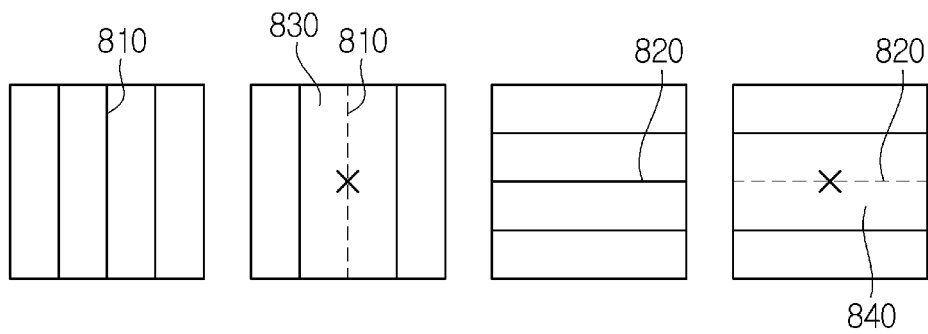
FIG. 8 is a view illustrating an embodiment of a redundant splitting pattern.

For example, FIG. 8 shows redundant splitting patterns which may occur in binary tree splitting and ternary tree splitting. As shown in FIG. 8, continuous binary splitting 810 and 820 for one direction of two-step levels have the same coding block structure as binary splitting for a center partition after ternary splitting. In this case, binary tree splitting for center blocks 830 and 840 of ternary tree splitting may be prohibited. this prohibition is applicable to CUs of all pictures. When such specific splitting is prohibited, signaling of corresponding syntax elements may be modified by reflecting this prohibited case, thereby reducing the number of bits signaled for splitting. For example, as shown in the example shown in FIG. 8, when binary tree splitting for the center block of the CU is prohibited, a syntax element mtt_split_cu_binary_flag indicating whether splitting is binary splitting or ternary splitting is not signaled and the value thereof may be derived as 0 by a decoding apparatus.

Overview of Intra Prediction

Hereinafter, an intra prediction method according to an embodiment will be described. Intra prediction may indicate prediction which generates prediction samples for a current block based on reference samples in a picture to which the current block belongs (hereinafter referred to as a current picture). When intra prediction applies to the current block, neighboring reference samples to be used for intra prediction of the current block may be derived. The neighboring reference samples of the current block may include a sample adjacent to a left boundary of the current block having a size of nW×nH and a total of 2×nH samples neighboring to the bottom-left, a sample adjacent to a top boundary of the current block and a total of 2×nW samples neighboring to the top-right, and one sample neighboring the top-left of the current block. Alternatively, the neighboring reference samples of the current block may include a plurality of columns of top neighboring samples and a plurality of rows of left neighboring samples. In addition, the neighboring reference samples of the current block may include a total of nH samples adjacent to a right boundary of the current block having a size of nW×nH, a total of nW samples adjacent to a bottom boundary of the current block, and one sample neighboring the bottom-right of the current block. Meanwhile, when ISP which will be described later is applied, the neighboring reference samples may be derived in units of sub-partitions.

On the other hand, some of the neighboring reference samples of the current block have not yet been decoded or may not be available. In this case, an image decoding apparatus may construct neighboring reference samples to be used for prediction, by substituting unavailable samples with available samples. Alternatively, neighboring reference samples to be used for prediction may be constructed using interpolation of available samples.

When the neighboring reference samples are derived, (i) a prediction sample may be derived based on average or interpolation of neighboring reference samples of the current block and (ii) the prediction sample may be derived based on a reference sample present in a specific (prediction) direction with respect to the prediction sample among the neighboring reference samples of the current block. The case of (i) may be referred to as a non-directional mode or a non-angular mode and the case of (ii) may be referred to as a directional mode or an angular mode. In addition, the prediction sample may be generated through interpolation with the second neighboring sample and the first neighboring sample located in the opposite direction of the prediction direction of the intra prediction mode of the current block based on the prediction sample of the current block among the neighboring reference samples. The above-described case may be referred to as linear interpolation intra prediction (LIP). In addition, chroma prediction samples may be generated based on luma samples using a linear model. The above-described case may be called an LM mode. In addition, a temporary prediction sample of the current block may be derived based on filtered neighboring reference samples, and the prediction sample of the current block may be derived by weighted-summing the temporary prediction sample and at least one reference sample derived according to the intra prediction mode among the existing neighboring reference samples, that is, the unfiltered neighboring reference samples. The above-described case may be referred to as position dependent intra prediction (PDPC). In addition, a reference sample line with highest prediction accuracy may be selected from multiple neighboring reference sample lines of the current block to derive a prediction sample using a reference sample located in a prediction direction in the corresponding line, and, at this time, intra prediction encoding may be performed by indicating (signaling) the used reference sample line to the decoding apparatus. The above-described case may be referred to as multi-reference line (MRL) intra prediction or MRL based intra prediction. In addition, the current block may be divided into vertical or horizontal sub-partitions to perform intra prediction based on the same intra prediction mode, and neighboring reference samples may be derived and used in units of sub-partitions. That is, in this case, the intra prediction mode for the current block is equally applied to the sub-partitions and the neighboring reference samples are derived and used in units of sub-partitions, thereby increasing intra prediction performance Such a prediction method may be referred to as intra sub-partitions (ISP) or ISP based intra prediction. In addition, when a prediction direction based on the prediction sample indicates a space between neighboring reference samples, that is, when the prediction direction indicates a fractional sample position, the value of the prediction sample may be derived through interpolation of a plurality of reference samples located around the prediction direction (around the fractional sample position). The above-described intra prediction methods may be referred to as intra prediction type to be distinguished from the intra prediction mode. In addition, after a prediction signal for a sub-sampled pixel set of the current block is generated using reconstructed neighboring pixels located on the left and top of the current block, the generated prediction signal and the neighboring sample value may be interpolated in the vertical and horizontal directions to generate the prediction signal having an original size, thereby applying matrix-weighted intra prediction (MIP) for performing intra prediction of the current block.

The intra prediction type may be referred to as various terms such as intra prediction scheme or additional intra prediction mode. For example, the intra prediction type (or the additional intra prediction mode) may include at least one of LIP, PDPC, MRL, ISP or MIP. Information on the intra prediction type may be encoded by an image encoding apparatus, included in a bitstream and signaled to a decoding apparatus. Information on the intra prediction type may be implemented in various forms such as flag information indicating whether to apply each intra prediction type or index information indicating one of several intra prediction types.

Meanwhile, if necessary, post-filtering may be performed with respect to the derived prediction sample. Specifically, the intra prediction procedure may include an intra prediction mode/type determination step, a neighboring reference sample derivation step and an intra prediction mode/type based prediction sample derivation step. In addition, if necessary, post-filtering may be performed with respect to the derived prediction sample.

Hereinafter, a video/image encoding method based on intra prediction will be described. First, the image encoding apparatus performs intra prediction with respect to a current block. The image encoding apparatus may derive an intra prediction mode/type for the current block, derive neighboring reference samples of the current block, and generate prediction samples in the current block based on the intra prediction mode/type and the neighboring reference samples. Here, the intra prediction mode/type determination, neighboring reference samples derivation and prediction samples generation procedures may be simultaneously performed or any one procedure may be performed before the other procedures. Meanwhile, when the below-described prediction sample filtering procedure is performed, an intra prediction unit 185 may further include a prediction sample filter. The image encoding apparatus may determine a mode/type applied to the current block among a plurality of intra prediction modes/types. The image encoding apparatus may compare rate-distortion (RD) costs for the intra prediction modes/types and determine an optimal intra prediction mode/type for the current block.

Meanwhile, the image encoding apparatus may perform a prediction sample filtering procedure. Prediction sample filtering may be referred to as post-filtering. By the prediction sample filtering procedure, some or all of the prediction samples may be filtered. In some cases, the prediction sample filtering procedure may be omitted.

Next, the image encoding apparatus may generate residual samples for the current block based on the prediction samples. The image encoding apparatus may compare the prediction samples in the original samples of the current block based on phase and derive the residual samples.

Next, the image encoding apparatus may encode image information including information on the intra prediction (prediction information) and residual information on the residual samples. The prediction information may include the intra prediction mode information and the intra prediction type information. The encoding apparatus may output the encoded image information in the form of a bitstream. The output bitstream may be transmitted to the decoding apparatus through a storage medium or a network.

The residual information may include residual coding syntax, which will be described later. The encoding apparatus may transform/quantize the residual samples and derive quantized transform coefficients. The residual information may include information on the quantized transform coefficients.

Meanwhile, as described above, the image encoding apparatus may generate a reconstructed picture (including reconstructed samples and reconstructed blocks). To this end, the image encoding apparatus may perform inverse quantize/inverse transform with respect to the quantized transform coefficients and derive (modified) residual samples. The reason for transforming/quantizing the residual samples and then performing inverse quantization/inverse transform is to derive the same residual samples as residual samples derived by the decoding apparatus as described above. The image encoding apparatus may generate a reconstructed bock including reconstructed samples for the current block based on the prediction samples and the (modified) residual samples. Based on the reconstructed block, the reconstructed picture for the current picture may be generated. As described above, an in-loop filtering procedure is applicable to the reconstructed picture.

Hereinafter, a video/image encoding method based on intra prediction will be described. The image decoding apparatus may perform operation corresponding to operation performed by the encoding apparatus.

First, the image decoding apparatus may derive an intra prediction mode/type for the current block based on the received prediction information (intra prediction mode/type information). The image decoding apparatus may derive neighboring reference samples of the current block. The image decoding apparatus may generate prediction samples in the current block based on the intra prediction mode/type and the neighboring reference samples. In this case, the image decoding apparatus may perform a prediction sample filtering procedure. Prediction sample filtering may be referred to as post-filtering. By the prediction sample filtering procedure, some or all of the prediction samples may be filtered. In some cases, the prediction sample filtering procedure may be omitted.

The image decoding apparatus may generate residual samples for the current block based on the received residual information. The image decoding apparatus may generate reconstructed samples for the current block based on the prediction samples and the residual samples and derive a reconstructed block including the reconstructed samples. Based on the reconstructed block, the reconstructed picture for the current picture may be generated. An in-loop filtering procedure is further applicable to the reconstructed picture.

The intra prediction mode information may include, for example, flag information (e.g., intra_luma_mpm_flag) indicating whether a most probable mode (MPM) or a remaining mode is applied to the current block, and, when the MPM is applied to the current block, the prediction mode information may further include index information (e.g., intra_luma_mpm_idx) indicating one of the intra prediction mode candidates (MPM candidates). The intra prediction mode candidates (MPM candidates) may configure an MPM candidate list or an MPM list. For example, the MPM candidate list may include an intra prediction mode of a neighboring block or a preset base intra prediction mode. In addition, when the MPM is not applied to the current block, the intra prediction mode information may further include remaining mode information (e.g., intra_luma_mpm_remainder) indicating one of the remaining intra prediction modes excluding the intra prediction mode candidates (MPM candidates). The image decoding apparatus may determine the intra prediction mode of the current block based on the intra prediction mode information.

In addition, the intra prediction type information may be implemented in various forms. For example, the intra prediction type information may include intra prediction type index information indicating one of the intra prediction types. As another example, the intra prediction type information may include at least one of reference sample line information (e.g., intra_luma_ref_idx) indicating whether to apply the MRL to the current block and, if applied, which reference sample line is used, ISP flag information (e.g., intra_subpartitions_mode_flag) indicating whether to apply the ISP to the current block, ISP type information (e.g., intra_subpartitions_split_flag) indicating the splitting type of the sub-partitions when applying the ISP, flag information indicating whether to apply PDPC or flag information indicating whether to apply LIP.

The intra prediction mode information and/or the intra prediction type information may be encoded/decoded through the coding method described in the present disclosure. For example, the intra prediction mode information and/or the intra prediction type information may be encoded/decoded through entropy coding (e.g., CABAC, CAVLC) based on a truncated (rice) binary code.

Figure 9:
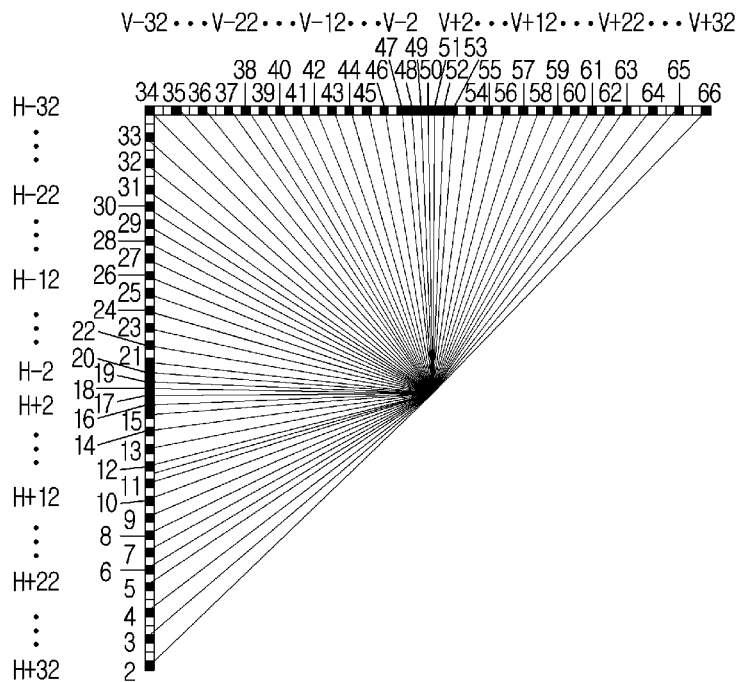
FIG. 9 is a view illustrating an intra prediction direction according to an embodiment.

Hereinafter, the intra prediction mode will be in greater detail. FIG. 9 shows an intra prediction direction according to an embodiment. In order to capture any edge direction presented in natural video, as shown in FIG. 9, the intra prediction mode may include two non-directional intra prediction modes and 65 directional intra prediction modes. The non-directional intra prediction modes may include a planar intra prediction mode and a DC intra prediction mode, and the directional intra prediction modes may include second to $66^{th}$ intra prediction modes.

Meanwhile, the intra prediction mode may further include a cross-component linear model (CCLM) mode for chroma samples in addition to the above-described intra prediction modes. The CCLM mode may be split into L_CCLM, T_CCLM, LT_CCLM according to whether left samples, upper samples or both thereof are considered for LM parameter derivation and may be applied only to a chroma component. For example, the intra prediction mode may be indexed as shown in the following table.

TABLE 2

| Intra prediction mode | Associated name |
| --- | --- |
| 0 | INTRA_PLANAR |
| 1 | INTRA_DC |
| 2 . . . 66 | INTRA_ANGULAR2 . . . INTRA_ANGULAR66 |
| 81 . . . 83 | INTRA_LT_CCLM, INTRA_L_CCLM, INTRA_T_CCLM |

Figure 10:
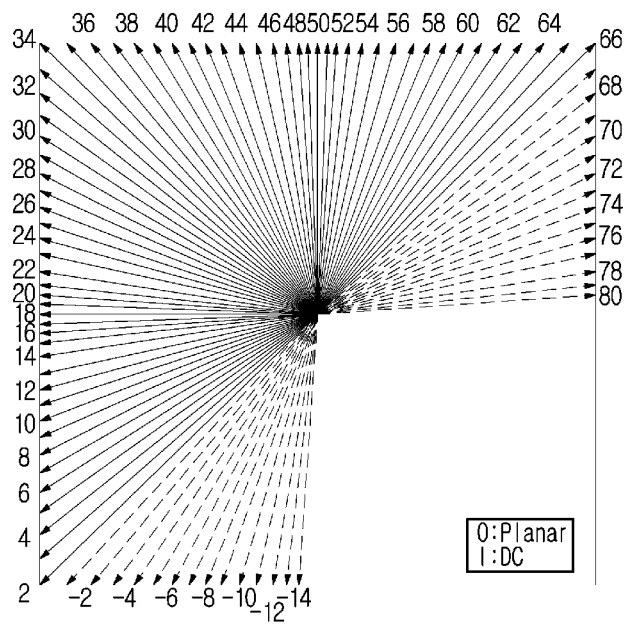
FIG. 10 is a view illustrating an intra prediction direction according to another embodiment.

FIG. 10 shows an intra prediction direction according to another embodiment. Here, a dotted-line direction shows a wide angle mode applied only to a non-square block. As shown in FIG. 10, in order to capture any edge direction presented in natural video, the intra prediction mode according to an embodiment may include two non-directional intra prediction modes and 93 directional intra prediction modes. The non-directional intra prediction modes may include a planar prediction mode and a DC prediction mode, and the directional intra prediction modes may include second to $80^{th}$ and $-1^{st}$ to $-14^{th}$ intra prediction modes, as denoted by arrow of FIG. 5. The planar prediction mode may be denoted by INTRA_PLANAR, and the DC prediction mode may be denoted by INTRA_DC. In addition, the directional intra prediction mode may be denoted by INTRA_ANGULAR-14 to INTRA_ANGULAR-1 and INTRA_ANGULAR2 to INTRA_ANGULAR80.

Meanwhile, the intra prediction type (or the additional intra prediction mode) may include at least one of LIP, PDPC, MRL, ISP or MIP. The intra prediction type may be indicated based on intra prediction type information, and the intra prediction type information may be implemented in various forms. For example, the intra prediction type information may include intra prediction type index information indicating one of the intra prediction types. As another example, the intra prediction type information may include at least one of reference sample line information (e.g., intra_luma_ref_idx) indicating whether to apply the MRL the current block and, if applied, which reference sample line is used, ISP flag information (e.g., intra_subpartitions_mode_flag) indicating whether to apply the ISP to the current block, ISP type information (e.g., intra_subpartitions_split_flag) indicating the splitting type of the sub-partitions when applying the ISP, flag information indicating whether to apply PDPC, flag information indicating whether to apply LIP or MIP flag information indicating whether to apply MIP.

Overview of Intra Sub-Partitions Mode

FIG. 11 is a view illustrating intra sub-partitions (ISP) among intra prediction techniques. In conventional intra prediction, a current block to be coded/decoded (current block) is regarded as one unit and coding/decoding is performed without splitting. However, when applying ISP, a current block may be split in a horizontal direction or a vertical direction and intra prediction coding/decoding may be performed. In this case, a reconstructed ISP subblock may be generated by performing coding/decoding in units of split ISP subblocks, and the reconstructed ISP subblock may be used as a reference block of a next split ISP subblock.

When an ISP mode applies to the current block, intra prediction may be performed with respect to each of ISP subblocks obtained by splitting a current block in a horizontal direction or a vertical direction. Intra prediction, residual signal generation and reconstructed signal generation are performed in units of ISP subblocks and a reconstructed signal of reconstructed sub-partition may be used as a reference sample of intra prediction of next sub-partition.

An image encoding apparatus may determine an ISP splitting direction using various methods (e.g., a method based on rate distortion optimization). The determined splitting direction is information on the ISP splitting direction and may be explicitly signaled through a bitstream. An image decoding apparatus may determine the ISP splitting direction of the current block based on the signaled information on the splitting direction. When the ISP splitting direction is implicitly determined by a coding parameter of the current block, such as the size (width or height) of the current block, the image encoding apparatus and the image decoding apparatus may determine the ISP splitting direction of the current block using the same method.

Each of ISP subblocks obtained by splitting the current block may be required to include a minimum of 16 samples. For example, when the current block is a 4×4 block, it may be implicitly determined that ISP does not apply. In addition, when the current block is a 4×8 block or an 8×4 block, as shown in FIG. 11(a), the current block to which ISP applies may be split into two ISP subblocks. In addition, when the current block is not a 4×4 block, a 4×8 block or an 8×4 block, as shown in FIG. 11(b), the current block to which ISP applies may be split into four ISP subblocks. In the examples shown in FIG. 11(a) and FIG. 11(b), when an ISP splitting direction is a horizontal direction, coding and/decoding may be performed in order from the top ISP subblock to the bottom ISP subblock. In addition, when the splitting direction is a vertical direction, coding and/decoding may be performed in order from the left ISP subblock to the right ISP subblock.

FIG. 12 is a view illustrating a structure of a bitstream of intra prediction information.

Whether ISP is available for the current block may be determined based on Equation 1 below. A condition of Equation 1 may be determined based on the luma component block of the current block. That is, under the following condition, the width, height and position of the current block may mean the width, height and position of the luma component block of the current block, respectively.

$$\text{intra\_luma\_ref\_idx}[x0][y0]==0\&\&$$
$$(\text{cbWidth}<=\text{MaxTbSize}Y|\text{cbHeight}<=\text{MaxTbSize}Y)$$
$$\&\&(\text{cbWidth}*\text{cbHeight}>\text{MinTbSize}Y*\text{MinTbSize}Y)$$
[Equation 1]

For example, when the condition of Equation 1 for the current block is satisfied, it may be determined that ISP is available for the current block. After determining that ISP is available for the current block, whether ISP applies to the current block may be determined.

In the ISP availability condition, (x0, y0) may be coordinates specifying the position of the top left sample of the current block. In addition, intra_luma_ref_idx[x0][y0] may be information specifying a reference line used for prediction of the current block. According to the ISP availability condition, when intra_luma_ref_idx is 0, that is, when the reference line used for prediction of the current block is a $0^{th}$ line (a reference line immediately adjacent to the current block), it may be determined that ISP is available for the current block. When the reference line used for prediction of the current block is a line other than the $0^{th}$ line, it may be determined that ISP is not available for the current block.

In the condition of Equation 1 above, cbWidth and cbHeight may mean the width and height of the current block, respectively. In addition, MaxTbSizeY and MinTbSizeY may mean a maximum transform size and a minimum transform size for the current block, respectively. As described above, residual processing may include transform or inverse transform. In this case, the size of a transform block in which transform or inverse transform is available may be predefined or signaled through a bitstream. That is, the maximum transform size may mean a maximum size of a transform block on which transform or inverse transform may be performed. In addition, the minimum transform size may mean a minimum size of a transform block on which transform or inverse transform may be performed. For example, when the size of the current block is greater than the maximum transform size, the current block may be split into two or more transform blocks. In addition, the current block may not be split into transform blocks having a size less than the minimum transform size. The maximum transform size and/or the minimum transform size may be predefined in the image encoding apparatus and the image decoding apparatus or may be derived based on information signaled at a higher level of the block.

According to the condition of Equation 1 above, only when at least one of cbWidth or cbHeight is equal to or less than MaxTbSizeY, it may be determined that ISP is available for the current block. That is, when both cbWidth and cbHeight are greater than MaxTbSizeY, it may be determined that ISP is not available for the current block. When cbWidth is greater than MaxTbSizeY and cbHeight is equal to or less than MaxTbSizeY and ISP applies to the current block, the ISP splitting direction may be determined to be a vertical direction as described below. When cbHeight is greater than MaxTbSizeY and cbWidth is equal to or less than MaxTbSizeY and ISP applies to the current block, the ISP splitting direction may be determined to be a horizontal direction as described below.

According to the condition of Equation 1 above, when cbWidth*cbHeight is greater than MinTbSizeY*MinTbSizeY, it may be determined that ISP is available for the current block. cbWidth*cbHeight may mean the area of the current block or the number of samples included in the current block. For example, in the case where MinTbSizeY is 4, only when the number of samples included in the current block is greater than 16(4*4), it may be determined that ISP is available for the current block.

For example, the image encoding apparatus may transmit whether to apply ISP in units of blocks. Specifically, the image encoding apparatus may signal whether to apply ISP to the current block using a syntax element intra_subpartions_mode_flag. For example, when intra_subpartions_mode_flag has a first value, ISP may apply to the current block, and, when intra_subpartions_mode_flag has a second value, ISP may not apply to the current block.

When ISP applies to the current block (e.g., intra_subpartions_mode_flag==1), the image encoding apparatus may signal the ISP splitting direction of the current block using a syntax element intra_subpartions_split_flag. For example, when intra_subpartions_split_flag has a first value, the ISP splitting direction of the current block may be determined to be a horizontal direction. In contrast, when intra_subpartions_split_flag has a second value, the ISP splitting direction of the current block may be determined to be a vertical direction. In this case, whether intra_subpartions_split_flag is encoded/decoded may be determined based on at least one of a size, position, maximum transform size or minimum transform size of the current block. Specifically, when the width and height of the current block is equal to or less than the maximum transform size of the current block (cbWidth<=MaxTbSizeY && cbHeight<=MaxTbSizeY), intra_subpartions_split_flag may be encoded/decoded.

When ISP applies to the current block, the intra prediction mode for the current block equally applies to all ISP subblocks and neighboring reference samples may be derived in units of ISP subblocks. As intra prediction is recursively performed using the neighboring reference sample of the ISP subblock, intra prediction performance may be improved. When ISP applies to the current block, a residual sample processing procedure may be performed in units of ISP subblocks. For example, intra prediction samples may be derived with respect to each ISP subblock and residual samples for the corresponding subblock may be added thereto, thereby obtaining reconstructed samples.

The residual signal (residual samples) may be derived through a dequantization/inverse transform procedure based on the residual information (quantized transform coefficient information or residual coding syntax) in the above-described bitstream. That is, derivation of prediction samples and derivation of residual samples may be performed with respect to a first ISP subblock, and, based on this, reconstructed samples for the first ISP subblock may be derived. In this case, when prediction samples for a second ISP subblock are derived, some (e.g., left or top neighboring reference samples of the second ISP subblock) of the reconstructed samples in the first ISP subblock may be used as neighboring reference samples for the second ISP subblock. Similarly, derivation of prediction samples and derivation of residual samples for the second ISP subblock may be performed and, based on this, reconstructed samples for the second ISP subblock may be derived. In this case, when prediction samples for a third ISP subblock are derived, some (e.g., left or top neighboring reference samples of the third ISP subblock) of the reconstructed samples in the second ISP subblock may be used as neighboring reference samples for the third ISP subblock. Hereinafter, it is the same.

Overview of CABAC (Context-Based Adaptive Binary Arithmetic Coding) and Residual Signal Coding/Decoding The image encoding/image decoding apparatus may encode/decode image information using CABAC. Some or all of the image information may be entropy-encoded by the entropy encoder 190 of FIG. 2 and some or all of the image information may be entropy-decoded by the entropy decoder 210. Syntax elements included in the residual signal described below may be entropy-encoded/decoded based on CABAC.

Figure 13:
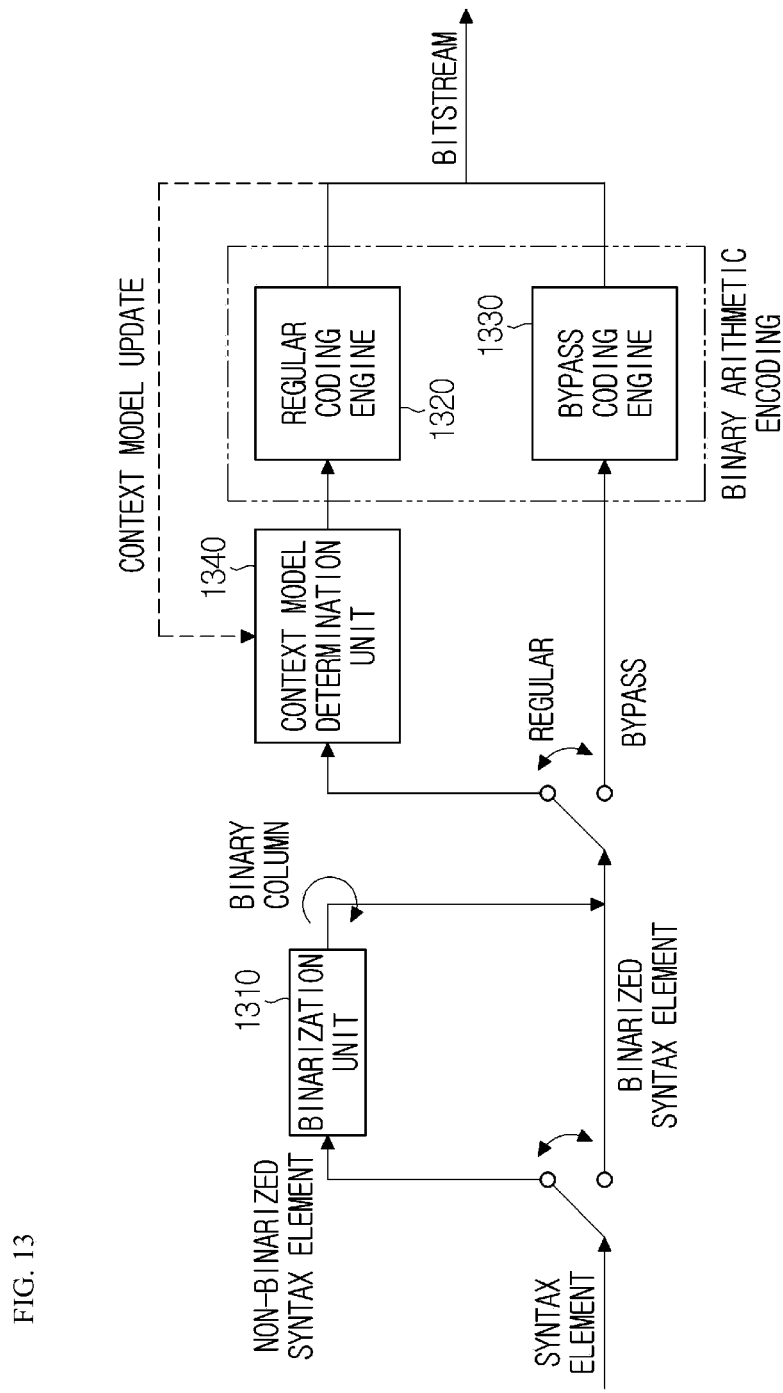
FIG. 13 is a view illustrating a CABAC entropy encoding method.

FIG. 13 is a view illustrating a CABAC entropy encoding method.

When an input signal is a syntax element having a non-binary value, the input signal may be converted into a binary value through a binarization unit 1310. When the input image already has a binary value, the binarization process may not be performed. In this case, each binary number 0 or 1 constituting the binary value may be referred to as a bin. For example, when a binary sequence after binarization is 110, each of 1, 1 and 0 may be one bine. Binary or binary sequence for one syntax element may represent a value of the corresponding syntax element.

Binarized bins may be input to a regular coding engine 1320 or a bypass coding engine 1330. A context model determination unit 1340 may assign a context model reflecting a probability value to a corresponding bin, and the regular coding engine 1320 may code the corresponding bin based on the assigned context model. After each bin is coded in the regular coding engine 1320, the probability model for the corresponding bin may be updated. The encoded bins may be context-coded bins. In the bypass coding engine 1330, a procedure for estimating a probability with respect to the input bin and a procedure for updating the probability model which has applied to the corresponding bin may be omitted. The bypass coding engine 1330 may code the input bin by applying a uniform probability distribution instead of assigning a context, thereby improving a coding rate. The bins coded through the bypass coding engine 1330 may be referred to as bypass bins.

The entropy encoder 190 may determine whether to perform coding through the regular coding engine 1320 or whether to perform coding through the bypass coding engine 1330 and switch a coding path.

Meanwhile, entropy decoding may be performed in the reverse order of the coding process of FIG. 13. The entropy decoder 210 may decode a bitstream into a binary sequence using one of a regular coding decoding engine or a bypass decoding engine. After decoding is performed in the regular decoding engine, the probability model for the corresponding bin may be updated. Meanwhile, in the bypass decoding engine, a procedure for estimating a probability with respect to the input bitstream and a procedure for updating the probability model may be omitted. The bin generated through one of the regular coding decoding engine or the bypass decoding engine may be finally reconstructed to a syntax element which is a first input signal through selective inverse binarization of an inverse binarization unit.

Residual samples may be derived using transform coefficients quantized through a transform and quantization process. The quantized transform coefficients may be defined as transform coefficients. Transform coefficients in the block may be signaled in the form of residual information. Residual information may include a residual coding syntax element. The image encoding apparatus may construct a residual coding syntax element with the residual information and encode and output it in the form of a bitstream. In contrast, the image decoding apparatus may obtain the quantized transform coefficients by decoding the residual coding syntax element from the bitstream. Hereinafter, the residual coding syntax element may be referred to as a syntax element.

FIGS. 14 to 17 are views illustrating a residual signal bitstream structure when applying encoding of a residual sample. For example, the transform coefficient may be coded/decoded using at least one residual coding syntax element of last_sig_coeff_x_prefix, last_sig_coeff_y_prefix, last_sig_coeff_x_suffix, last_sig_coeff_y_suffix, coded_sub_block_flag, sig_coeff_flag, abs_level_gtX_flag, par_level_flag, abs_remainder or dec_abs_level, coeff_sign_flag. A process of coding/decoding the transform coefficient using the syntax element may be defined as residual (data) coding or (transform) coefficient coding. In this case, the transform/quantization process may be omitted. Hereinafter, each of the above-described syntaxes will be described in detail. The names of the syntax elements described below are examples and the scope of the present disclosure is not limited by the names of the syntax elements.

The syntax elements last_sig_coeff_x_prefix, last_sig_coeff_y_prefix, last_sig_coeff_x_suffix and last_sig_coeff_y_suffix are syntax elements for coding (x, y) position information of a final non-zero coefficient in an associated block. In this case, the associated block may be a coding block (CB) or a transform block (TB). Hereinafter, a block in the transform, quantization and residual coding process may be a coding block or a transform block.

Specifically, last_sig_coeff_x_prefix may specify a prefix of a column position of a last significant coefficient in the scan order in the transform block, and last_sig_coeff_y_prefix may specify a prefix of a row position of the last significant coefficient in the scan order in the transform block. last_sig_coeff_x_suffix may specify a suffix of a column position of a last significant coefficient in the scan order in the transform block, and last_sig_coeff_y_suffix may specify a suffix of a row position of the last significant coefficient in the scan order in the transform block. The significant coefficient may mean a non-zero coefficient. The scan order may be one of a top-right diagonal scan order, a bottom-left diagonal scan order, a horizontal scan order and a vertical scan order. In this case, the horizontal scan order may mean the scan order from the left to the right, and the vertical scan order may mean the scan order from the top to the bottom. The scan order may be determined based on whether intra/inter prediction applies to a target block and/or a detailed intra/inter prediction mode.

The syntax element coded_sub_block_flag may specify whether each subblock includes a non-zero coefficient when the current block is partitioned into subblocks. In an embodiment, the size of the subblock may be 4×4 or 2×2. In this case, the subblock may be represented by a coefficient group (CG).

For example, when the value of coded_sub_block_flag is 0, since there is no more information to be transmitted, the coding process of the subblock may end. In contrast, when the value of coded_sub_block_flag is 1, a process of coding/decoding sig_coeff_flag may be performed. According to the scan order, signaling of coded_sub_block_flag may not be performed with respect to a last subblock including a non-zero coefficient. This may be because, in a top left subblock, since there is a DC coefficient, a probability that there is a non-zero coefficient is high. Accordingly, coded_sub_block_flag may not be coded with respect to a last subblock including a non-zero coefficient and the value thereof may be set to 1.

When coded_sub_block_flag specifies that there is a non-zero coefficient in a current subblock, sig_coeff_flag having a binary value may be coded/decoded tin he reversely scanned order. A 1-bit syntax element sig_coeff_flag[n] may be coded/decoded with respect to the coefficient at the corresponding scan position n according to the scan order. A syntax element sig_coeff_flag[n] may specify whether the coefficient at the current scan position has a value of 0. In the case of a subblock including a last non-zero coefficient, sig_coeff_flag[n] does not need to be coded/decoded with respect to the last non-zero coefficient and thus a coding/decoding process may be skipped.

Only when sig_coeff_flag[n] is 1, level information coding/decoding may be performed. In this case, the level information coding/decoding process may be performed using at least one of the above-described syntax elements. Meanwhile, the syntax element sig_coeff_flag[xC][yC] may specify whether the transform coefficient at each transform coefficient position (xC, yC) in the current block is 0.

The remaining level value after coding/decoding sig_coeff_flag[n] may be derived according to Equation 2 below.

remAbsLevel[$n$]=|coeff[$n$]|−1     [Equation 2]

In this case, a syntax element remAbsLevel[n] may specify a level value to be coded/encoded at a scan position n. coeff[n] may mean an actual transform coefficient value.

A syntax element abs_level_gtx_flag[n][0] may specify whether |coeff[n]| at the scan position n is greater than 1. When the value of abs_level_gtX_flag[n][0] is 0, the absolute value of the coefficient at the corresponding position may be 1. In contrast, when the value of abs_level_gtX_flag[n][0] is 1, remAbsLevel[n] may be derived according to Equation 3 below.

remAbsLevel[$n$]=remAbsLevel[$n$]−1     [Equation 3]

A syntax element par_level_flag[n] may be used to code/decode a least significant coefficient (LSB) value of remAbsLevel[n] according to Equation 4 below. That is, par_level_flag[n] may specify a parity of a transform coefficient level value at the scan position n. After coding/decoding par_leve_flag[n], remAbsLevel[n] may be updated according to Equation 4 below.

par_level_flag[$n$]=remAbsLevel[$n$]&1 remAbsLevel[$n$]=remAbsLevel[$n$]>>1     [Equation 4]

A syntax element abs_level_gtx_flag[n][1] may specify whether |coeff[n]| at the scan position n is greater than 3. For example, only when abs_level_gtX_flag[n][1] is 1, abs_remainder[n] may be coded/decoded. For example, a relationship between coeff[n] and each syntax element may be expressed as shown in Equation 5 below. In this case, |coeff[n]| may specify a transform coefficient level value and may be expressed as AbsLevel[n] for the transform coefficient. A syntax element coeff_sign_flag[n] may specify the sign of the transform coefficient at the corresponding scan position n. In summary, abs_level_gtx_flag[n][i] may be a syntax element specifying whether the absolute value of the transform coefficient is greater than any one of 1 or 3.

|coeff[$n$]|=sig_coeff_flag[$n$]+abs_level_gtX_flag[$n$][0]+par_level_flag[$n$]+2*(abs_level_gtx_flag[$n$][1]+abs_remainder[$n$])     [Equation 5]

Meanwhile, CABAC provides high performance, but has a disadvantage that throughput performance is not good. This may be due to the regular coding engine of CABAC. The regular coding engine uses a probability state and range updated through coding of a previous bin and thus has high data dependency and has a problem that it takes considerable time to read a probability section and to determine a current state. In this case, when the number of context-coded bins is limited, the CABAC throughput problem may be solved.

For example, a sum of bins used to express sig_coeff_flag[n], abs_level_gtX_flag[n][0], par_level_flag[n] and abs_level_gtx_flag[n][1] may be limited according to the size of the subblock. For example, the sum of the bins may be limited to a value of ((1<<(log 2TbWidth+log 2TbHeight))*7)>>2. For example, the sum of the bins may be limited to a value of 1.75 times the size of the transform block including a current CG. This may mean that 1.75 context-coded bins may be used for one pixel position on average. When all a limited number of context-coded bins are used, CABAC may not apply to the remaining coefficients and bypass coding/decoding may be performed. That is, when the number of coded/decoded bins is 32 in a 4×4 CG and is 8 in a 2×2 C, sig_coeff_flag[n], abs_level_gtX_flag[n][0], par_level_flag[n], abs_level_gtx_flag[n][1] may not be additionally coded. In this case, |coeff[n]| may be coded/decoded into a preset dec_abs_level[n].

Overview of Residual Signal Coding/Decoding According to Transform Skip Mode

As described above, the transformer 120 of the image encoding apparatus may perform transform with respect to a residual signal to generate transform coefficients. The transform coefficients may be signaled to the image decoding apparatus through the quantization and entropy encoding, and the inverse transformer 230 of the image decoding apparatus may perform inverse transform with respect to the transform coefficients to reconstruct the transform coefficients. In a special case, the image encoding apparatus may perform entropy encoding without performing transform with respect to the residual signal. Such operation of the image encoding apparatus may be defined as application of a transform skip process or a transform skip mode. The inverse transformer 230 of the image decoding apparatus may not perform inverse transform with respect to the residual signal whose transform is skipped.

The image encoding apparatus may transmit information specifying whether the transform skip mode applies to the current block. For example, the image encoding apparatus may signal whether the transform skip mode applies to the current block through a syntax element transform_skip_flag. transform_skip_flag may be signaled based on at least one of the height, width or maximum transform size of the current block. For example, whether to encode/decode transform_skip_flag of the current block may be determined according to the condition of Equation 6 below.

transform_skip_enabled_flag&&log
 2TbWidth<=MaxTsSize&&log
 2TbHeight<=MaxTsSize  [Equation 6]

In this case, transform_skip_enabled_flag may be a syntax element specifying whether to apply the transform skip mode, and may be signaled at at least one level of a sequence level, a picture level, a tile level, a tile group level or a slice level.

When the transform skip mode applies to the current block, encoding/decoding of the above-described residual signal may be performed according to the following characteristics compared to the case of applying transform.

When applying the transform skip mode, since the residual signal reflects spatial residual after prediction and energy compression is not performed by transform, a probability that insignificant levels or a continuous value of 0 appears at the bottom right corner of the transform block is not high. Therefore, signaling of a last significant scan position may not be required. Therefore, when applying transform skip, signaling of the last significant scan position may be skipped.

As the last significant scan position is not signaled, signaling of whether encoding of a subblock using coded_sub_block_flag is performed may be modified when transform is skipped. For example, in the case where transform is performed and the last significant scan position is signaled, when the last significant scan position specifies the position of a subblock other than a DC subblock (top left subblock) covering a DC frequency position, coded_sub_block_flag for the DC subblock may not be signaled and may be derived to always specify a value of 1. In this case, even when the DC subblock includes only 0 or an insignificant level value, the value of coded_sub_block_flag may be derived as 1. However, in the case of skipping transform, as signaling of the last significant scan position is skipped, coded_sub_block_flag for each subblock may be signaled. When the values of all coded_sub_block_flag are not 0, coded_sub_block_flag of the DC subblock may also be signaled.

Meanwhile, when all the values of coded_sub_block_flag are 0, coded_sub_block_flag of the last subblock in the scan order may not be signaled and may be derived as 1. In this case, as at least one significant level value needs to be present in the corresponding subblock, if all the other values of sig_coeff_flag syntax elements present in the corresponding subblock are equal to 0, a last parsed sig_coeff_flag syntax element in the scan order may not be signaled and may be derived as 1.

More specifically, the top left subblock and the top left position in the subblock have a last scan order, coded_sub_block_flag of the DC subblock may not be signaled and may be derived as 1 (inferDcSbCbf=1). In this case, as at least one significant level value needs to be present in the DC subblock, if all the other values of sig_coeff_flag syntax elements present in the corresponding DC subblock are equal to 0, a sig_coeff_flag syntax element for the top left position (0, 0) may not be signaled and derived as 1 (inferSbDcSigCoeffFlag=1).

In addition, context modeling for coded_sub_block_flag may also be modified. A context model index may be calculated as a sum or logical disjunction of coded_sub_block_flag of right and bottom neighboring blocks of a current subblock.

In addition, in sig_coeff flag context modeling, a local template may be modified to include only a right neighboring block $NB_0$ and bottom neighboring block $NB_1$ of a current scan position. A context model offset may be determined by the number of significant neighboring positions, and may be calculated by sig_coeff_flag[$NB_0$]+sig_coeff_flag[$NB_1$]. Accordingly, selection of different context sets according to a diagonal d in the current transform block may be removed. As a result, three context models and a single context model set for encoding a sig_coeff_flag flag may be generated.

In addition, for context modeling of abs_level_gtX_flag[ ][0] and par_level_flag[ ], a single context model for abs_level_gt1_flag and par_level_flag may be employed.

In addition, with respect to abs_remainder[ ] encoding, an empirical distribution of transform-skipped residual absolute values generally corresponds to Laplacian or geometric distribution, but is shown to have greater instationarity than the absolute value of the transformed coefficient. Therefore, abs_remainder syntax binarization and context modeling may be modified as follows.

In an embodiment, a high cutoff value may be used during binarization. For example, dedicated context models for encoding transition point and each bin position using sig_coeff_flag, abs_level_gt1_flag, par_level_flag and abs_level_gt3_flag for Rice code of Abs_remainder may have higher compression efficiency. By increasing the cutoff, a higher "greater than X" flag may be used. For example, a "greater than X" flag such as abs_level_gtX_flag[ ][2], abs_level_gtX_flag[ ][3], . . . , abs_level_gtX_flag[ ][n] may be used, where n may be an integer of 9 or more. In an embodiment, n may be 5. In an embodiment, the value of abs_level_gtX_flag[ ][n] may be determined to be (n<<1)+1. For example, abs_level_gtX_flag[ ][2] may be determined to be 5, abs_level_gtX_flag[ ][3] may be determined to be 7, abs_level_gtX_flag[ ][4] may be determined to be 9, and abs_level_gtX_flag[ ][n] may be determined to be 2n+1.

In addition, a template for deriving a Rice parameter may be modified. For example, only left and bottom neighbors of the current scan position may be referenced like the above-described sig_coeff_flag context modeling.

In addition, with respect to coeff_sign_flag context modeling, based on instationarity in a sequence of signs and the fact that predicted residual is often biased, the sign may be encoded using a context model. A single dedicated context model may be used to encode the sign and the sign may be parsed after sig_coeff_flag in order to keep context-coded bins together.

In addition, with respect to reduction of context-coded bins, a first scanning pass such as transmission of sig_coeff_flag, abs_level_gtX_flag and par_level_flag syntax elements may not be changed. However, the limit on the maximum number of context coded bins per sample (CCBs) may be removed, and this may be controlled using another method. For example, reduction of CCBs may be ensured by invalidating modes having CCBs greater than k. Here, k may be a positive integer. For example, when k has a value of 2, reduction of a quantization space may be derived In addition, with respect to forward coefficient scanning, the scan order of subblocks and coefficients of the subblocks may be from the top left coefficient to the bottom right position according to the diagonal scan order.

As described above, an embodiment of a bitstream structure when applying the transform skip mode is shown in FIGS. 18 to 20. FIGS. 18 to 20 are views illustrating an embodiment of a residual signal bitstream structure when applying a transform skip mode to a current block.

Overview of Block Difference Pulse Code Modulation (BDPCM)

The image encoding apparatus and the image decoding apparatus according to an embodiment may perform differential encoding of a residual signal. For example, the image encoding apparatus may encode the residual signal by subtracting a prediction signal from the residual signal of a current block, and the image decoding apparatus may decode the residual signal by adding the prediction signal to the residual signal of the current block. The image encoding apparatus and the image decoding apparatus according to an embodiment may perform differential encoding of the residual signal by applying BDPCM described below.

BDPCM according to the present disclosure may be performed in a quantized residual domain. The quantized residual domain may include a quantized residual signal (or quantized residual coefficient), and, when applying BDPCM, transform of the quantized residual signal may be skipped. For example, when applying BDPCM, transform of the residual signal may be skipped and quantization may be performed. Alternatively, the quantized residual domain may include quantized transform coefficients.

In an embodiment to which BDPCM applies, the image encoding apparatus may derive a residual block of a current block predicted in an intra prediction mode and quantize the residual block, thereby deriving a residual block. When a differential encoding mode of the residual signal is performed with respect to the current block, the image encoding apparatus may perform differential encoding with respect to the residual block to derive a modified residual block. In addition, the image encoding apparatus may encode differential encoding mode information specifying the differential encoding mode of the residual signal and the modified residual block, thereby generating a bitstream.

More specifically, when BDPCM applies to the current block, a predicted block (prediction block) including predicted samples of the current block may be generated by intra prediction. In this case, an intra prediction mode for performing intra prediction may be signaled through a bitstream and may be derived based on a prediction direction of BDPCM described below. In addition, in this case, the intra prediction mode may be determined to be one of a vertical prediction direction mode or a horizontal prediction direction mode. For example, when the prediction direction of BDPCM is a horizontal direction, the intra prediction mode may be determined to be a horizontal prediction direction mode, and the prediction block of the current block may be generated by intra prediction of the horizontal direction. Alternatively, when the prediction direction of BDPCM is a vertical direction, the intra prediction mode may be determined to be a vertical prediction direction mode, and the prediction block of the current block may be generated by intra prediction of the vertical direction. When applying intra prediction of the horizontal direction, a value of a pixel adjacent to the left of the current block may be determined to be a prediction sample value of samples included in a corresponding row of the current block. When applying intra prediction of the vertical direction, a value of a pixel adjacent to the top of the current block may be determined to be a prediction sample value of samples included in a corresponding column of the current block. When applying BDPCM to the current block, a method of generating the prediction block of the current block may be equally performed in an image encoding apparatus and an image decoding apparatus.

When applying BDPCM to the current block, the image encoding apparatus may generate a residual block including residual samples of the current block, by subtracting the prediction sample from the current block. The image encoding apparatus may quantize the residual block and then encode a difference (or delta) between a quantized residual sample and a predictor of the quantized residual sample. The image decoding apparatus may generate the quantized residual block of the current block, by obtaining the quantized residual sample of the current block based on the predictor and the difference reconstructed from a bitstream. Thereafter, the image decoding apparatus may dequantize the quantized residual block and then add it to the prediction block, thereby reconstructing the current block.

Figure 21:
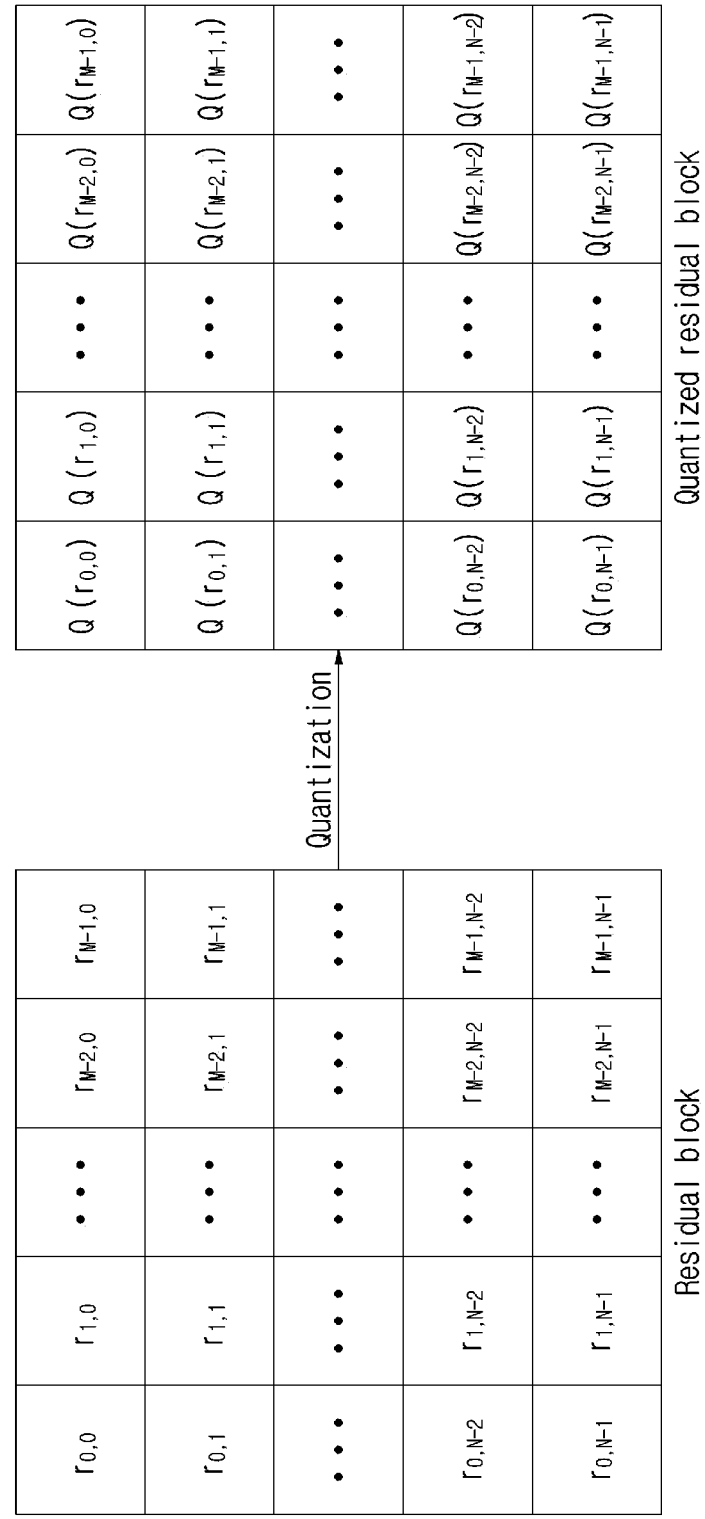
FIG. 21 is a view illustrating a method of encoding a residual sample of BDPCM according to an embodiment.

FIG. 21 is a view illustrating a method of encoding a residual sample of BDPCM according to the present disclosure. The residual block of FIG. 21 may be generated by subtracting a prediction block from a current block in an image encoding apparatus. The quantized residual block of FIG. 21 may be generated by quantizing the residual block by the image encoding apparatus. In FIG. 21, $r_{i,j}$ specifies a value of a residual sample of the (i, j) coordinates in a current block. When the size of the current block is M×N, a value i may be from 0 to M−1, inclusive. In addition, a value j may be from 0 to N−1, inclusive. For example, $r_{i,j}$ may be derived by subtracting the value of the prediction sample from the value of an original sample of the (i,j) coordinates in the current block. In FIG. 21, $Q(r_{i,j})$ specifies a value of the quantized residual sample of the (i, j) coordinates in the current block. Prediction of BDPCM may be performed with respect to the quantized residual samples of FIG. 21, thereby generating a modified quantized residual block having a size of M×N including modified quantized residual samples.

When the prediction direction of BDPCM is a horizontal direction, the value $r'_{i,j}$ of the modified quantized residual sample of the (i, j) coordinates in the current block may be calculated as shown in Equation 7.

$$r'_{i,j} = \begin{cases} Q(r_{i,j}), & i = 0, & 0 \le j \le (N-1) \\ Q(r_{i,j}) - Q(r_{(i-1),j}), & 1 \le i \le (M-1), & 0 \le j \le (N-1) \end{cases}$$ [Equation 7]

As shown in Equation 7 above, when the prediction direction of BDPCM is a horizontal direction, the value $r'_{0,j}$ of the (0, j) coordinates is assigned a value $Q(r_{0,j})$ of the quantized residual sample without change. The value $r'_{i,j}$ of the other (i, j) coordinates is derived as a difference between the value $Q(r_{i,j})$ of the quantized residual sample of the (i, j) coordinates and the value $Q(r_{i-1,j})$ of the quantized residual sample of the (i−1,j) coordinates. That is, instead of encoding the value $Q(r_{i,j})$ of the quantized residual sample of the (i, j) coordinates, a difference calculated using the value $Q(r_{i-1,j})$ of the quantized residual sample of the (i−1, j) coordinates as prediction value is derived as the modified quantized residual sample value $r'_{i,j}$ and then the value $r'_{i,j}$ is encoded.

When the prediction direction of BDPCM is a vertical direction, the value $r'_{0,j}$ of the modified quantized residual sample of the (0, j) coordinates in the current block may be calculated as shown in Equation 8.

$$r'_{i,j} = \begin{cases} Q(r_{i,j}), & 0 \le i \le (M-1), \quad j = 0 \\ Q(r_{i,j}) - Q(r_{(i-1),j}), & 0 \le i \le (M-1), \ 1 \le j \le (N-1) \end{cases} \quad [\text{Equation 8}]$$

As shown in Equation 8 above, when the prediction direction of BDPCM is a vertical direction, the value $r'_{0,j}$ of the (i, 0) coordinates is assigned a value $Q(r_{i,0})$ of the quantized residual sample without change. The value $r'_{i,j}$ of the other (i, j) coordinates is derived as a difference between the value $Q(r_{i,j})$ of the quantized residual sample of the (i, j) coordinates and the value $Q(r_{i,j-1})$ of the quantized residual sample of the (i, j−1) coordinates. That is, instead of encoding the value $Q(r_{i,j})$ of the quantized residual sample of the (i, j) coordinates, a difference calculated using the value $Q(r_{i,j-1})$ of the quantized residual sample of the (i, j−1) coordinates as prediction value is derived as the modified quantized residual sample value $r'_{i,j}$ and then the value $r'_{i,j}$ is encoded.

As described above, a process of modifying a current quantized residual sample value using an adjacent quantized residual sample value as a prediction value may be referred to as BDPCM prediction.

Finally, the image encoding apparatus may encode and transmit a modified quantized residual block including the modified quantized residual samples to an image decoding apparatus. In this case, as described above, transform of the modified quantized residual block is not performed.

FIG. 22 is a view illustrating a modified quantized residual block generated by performing BDPCM according to an embodiment.

In FIG. 22, horizontal BDPCM specifies a modified quantized residual block generated according to Equation 7 above, when the prediction direction of BDPCM is a horizontal direction. In addition, vertical BDPCM specifies a modified quantized residual block generated according to Equation 2 above, when the prediction direction of BDPCM is a vertical direction.

Figure 23:
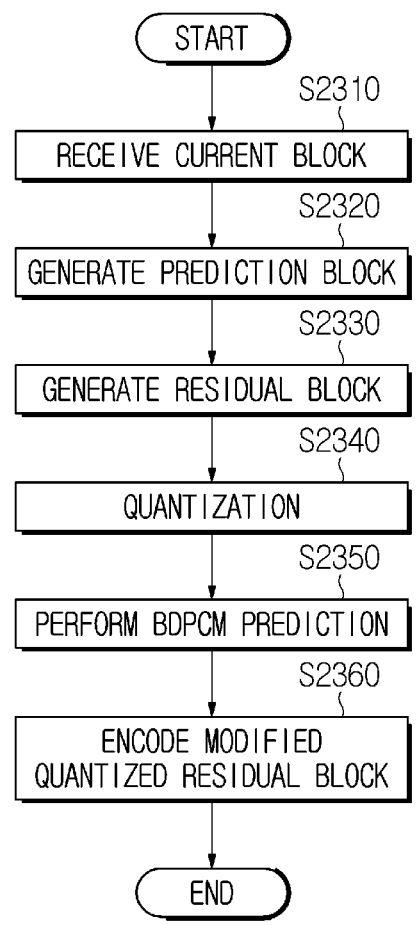
FIG. 23 is a flowchart illustrating a procedure for encoding a current block by applying BDPCM in an image encoding apparatus according to an embodiment.

FIG. 23 is a flowchart illustrating a procedure for encoding a current block by applying BDPCM in an image encoding apparatus.

First, when a current block which is a block to be encoded is input (S2310), prediction may be performed with respect to the current block to generate a prediction block (S2320). The prediction block of step S2320 may be an intra-predicted block, and the intra prediction mode may be determined as described above. A residual block of the current block may be generated based on the prediction block generated in step S2320 (S2330). For example, the image encoding apparatus may generate a residual value (a value of a residual sample) by subtracting the prediction block (a value of a predicted sample) from the current block (a value of an original sample). For example, by performing step S2330, the residual block of FIG. 22 may be generated. Quantization may be performed with respect to the residual block generated in step S2330 (S2340), a quantized residual block may be generated, and BDPCM prediction may be performed with respect to the quantized residual block (S2350). The quantized residual block generated as a result of performing step S2340 may be the quantized residual block of FIG. 21, and the modified quantized residual block of FIG. 22 may be generated according to the prediction direction as a result of BDPCM prediction of step S2350. BDPCM prediction of step S2350 was described with reference to FIGS. 21 to 22 and a detailed description thereof will be omitted. Thereafter, the image encoding apparatus may generate a bitstream by encoding the modified quantized residual block (S2360). In this case, transform for the modified quantized residual block may be skipped.

BDPCM operation in the image encoding apparatus described with reference to FIGS. 21 to 23 may be reversely performed in the image decoding apparatus.

Figures 24, 25:
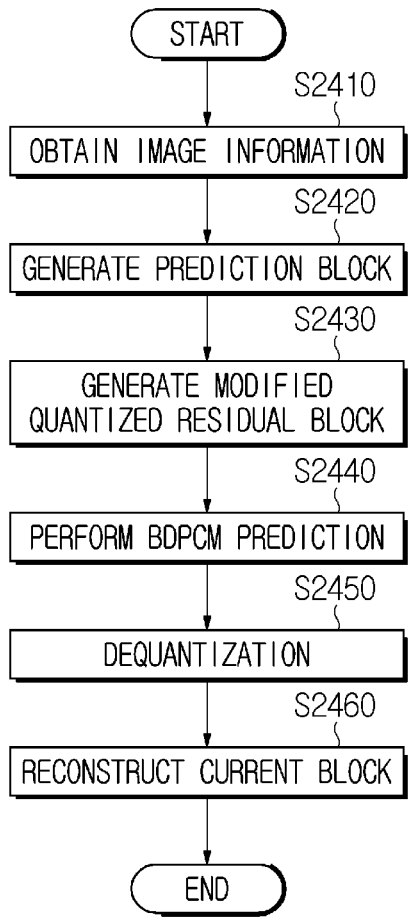
FIG. 24 is a flowchart illustrating a procedure for reconstructing a current block by applying BDPCM in an image decoding apparatus according to an embodiment.
FIG. 25 is a view schematically illustrating information on BDPCM included in a syntax structure of a current block according to an embodiment.

FIG. 24 is a flowchart illustrating a procedure for reconstructing a current block by applying BDPCM in an image decoding apparatus.

The image decoding apparatus may obtain information (image information) necessary to reconstruct a current block from a bitstream (S2410). The information necessary to reconstruct the current block may include information on prediction of the current block (prediction information) and information on a residual of the current block (residual information). The image decoding apparatus may perform prediction with respect to the current block based on the information on the current block and generate a prediction block (S2420). Prediction of the current block may be intra prediction and a detailed description thereof is the same as that described with reference to FIG. 23. In FIG. 24, step S2420 of generating the prediction block of the current block is shown as being performed prior to steps S2430 to S2450 of generating a residual block of the current block. However, the present disclosure is not limited thereto and the prediction block of the current block may be generated after the residual block of the current block is generated. Alternatively, the residual block of the current block and the prediction block of the current block may be simultaneously generated.

The image decoding apparatus may generate the residual block of the current block by parsing the residual information of the current block from the bitstream (S2430). The residual block generated in step S2430 may be the modified quantized residual block shown in FIG. 22.

The image decoding apparatus may perform BDPCM prediction with respect to the modified quantized residual block of FIG. 22 (S2440) to generate the quantized residual block of FIG. 21. BDPCM prediction of step S2440 is a procedure for generating the quantized residual block of FIG. 21 from the modified quantized residual block of FIG. 22 and thus may correspond to the reverse process of step S2350 performed by the image encoding apparatus. For example, when differential encoding mode information (e.g., bdpcm_flag) obtained from the bitstream specifies a differential encoding mode in which differential encoding of the residual coefficient is performed as BDPCM applies, the image decoding apparatus may perform differential encoding with respect to the residual block to derive a modified residual block. The image decoding apparatus may modify at least one residual coefficient to be modified among residual coefficients in the residual block, using the residual coefficient to be modified and a prediction residual coefficient. The prediction residual coefficient may be determined based on a prediction direction specified by differential encoding direction (e.g., bdpcm_dir_flag) obtained from the bitstream. The differential encoding direction information may specify any one of a vertical direction or a horizontal direction. The image decoding apparatus may assign a value obtained by adding the residual coefficient to be modified and the prediction residual coefficient to the position of the residual coefficient to be modified. Here, the prediction residual coefficient may be an adjacent coefficient immediately before the residual coefficient to be modified in the order according to the prediction direction.

BDPCM prediction of step S2440 performed by the image decoding apparatus will be described in greater detail below. When the prediction direction of BDPCM is a horizontal direction, the image decoding apparatus may generate a quantized residual block from a modified quantized residual block using Equation 9.

$$Q(r_{i,j}) = \Sigma_{k=0}^{i} r'_{k,j}, 0 \le i \le (M-1), 0 \le j \le (N-1) \quad \text{[Equation 9]}$$

As defined in Equation 9, the value $Q(r_{i,j})$ of the quantized residual value of the (i,j) coordinates may be calculated by summing the values of the modified quantized residual samples from the (0,j) coordinates to the (i,j) coordinates.

Alternatively, instead of Equation 9 above, the value $Q(r_{i,j})$ of the quantized residual value of the (i, j) coordinates may be calculated using Equation 10.

$$Q(r_{i,j}) = \quad \text{[Equation 10]}$$
$$\begin{cases} r'_{i,j}, & i=0, \quad 0 \le j \le (N-1) \\ r'_{i,j} + Q(r_{(i-1),j}), & 1 \le i \le (M-1), \quad 0 \le j \le (N-1) \end{cases}$$

Equation 10 above is the reverse process corresponding to Equation 7. According to Equation 4 above, the value $Q(r_{0,j})$ of the quantized residual sample of the (0,j) coordinates is derived as a value $r'_{0,j}$ of the modified quantized residual sample of the (0,j) coordinates. $Q(r_{i,j})$ of the other (i,j) coordinates is derived as a sum of the value $r'_{i,j}$ of the modified quantized residual sample of the (i,j) and the value $Q(r_{i-1,j})$ of the quantized residual sample of the (i−1, j) coordinates. That is, the quantized residual sample value $Q(r_{i,j})$ may be derived by summing a difference $r'_{i,j}$ using the value $Q(r_{i-1, j})$ of the quantized residual sample of the (i−1, j) coordinates as a prediction value.

When the prediction direction of BDPCM is a vertical direction, the image decoding apparatus may generate a quantized residual block from a modified quantized residual block using Equation 11.

$$Q(r_{i,j}) = \Sigma_{k=0}^{j} r'_{i,k}, 0 \le i \le (M-1), 0 \le j \le (N-1) \quad \text{[Equation 11]}$$

As defined in Equation 11, the value $Q(r_{i,j})$ of the quantized residual value of the (i,j) coordinates may be calculated by summing the values of the modified quantized residual samples from the (i, 0) coordinates to the (i, j) coordinates.

Alternatively, instead of Equation 11 above, the value $Q(r_{i,j})$ of the quantized residual value of the (i,j) coordinates may be calculated using Equation 12.

$$Q(r_{i,j}) = \quad \text{[Equation 12]}$$
$$\begin{cases} r'_{i,j}, & 0 \le i \le (M-1), \quad j=0 \\ r'_{i,j} + Q(r_{i,(j-1)}), & 0 \le i \le (M-1), \quad 1 \le j \le (N-1) \end{cases}$$

Equation 12 above is the reverse process corresponding to Equation 2. According to Equation 12 above, the value $Q(r_{i, 0})$ of the quantized residual sample of the (i, 0) coordinates is derived as a value $r'_{0,j}$ of the modified quantized residual sample of the (i, 0) coordinates. $Q(r_{i, j})$ of the other (i, j) coordinates is derived as a sum of the value $r'_{i, j}$ of the modified quantized residual sample of the (i, j) and the value $Q(r_{i,j-1})$ of the quantized residual sample of the (i, j−1) coordinates. That is, the quantized residual sample value $Q(r_{i,j})$ may be derived by summing a difference $r'_{i,j}$ using the value $Q(r_{i,j-1})$ of the quantized residual sample of the (i, j−1) coordinates as a prediction value.

When the quantized residual block composed of the quantized residual samples is generated by performing step S24540 by the above-described method, the image decoding apparatus may generate the residual block of the current block, by performing dequantization with respect to the quantized residual block (S2450). When applying BDPCM, as described above, transform for the current block is skipped and thus inverse transform of the dequantized residual block may be skipped.

Thereafter, the image decoding apparatus may reconstruct the current block based on the prediction block generated in step S2420 and the residual block generated in step S2450 (S2460). For example, the image decoding apparatus may reconstruct the current block (the value of the reconstructed block) by adding the prediction block (the value of the predicted sample) and the residual block (the value of the residual sample).

Differential encoding information specifying whether BDPCM applies to the current block may be signaled through a bitstream. In addition, when BDPCM applies to the current block, differential encoding information specifying a prediction direction of BDPCM may be signaled through a bitstream. When BDPCM does not apply to the current block, the differential encoding information may not be signaled.

FIG. 25 is a view schematically illustrating information on BDPCM included in a syntax structure of a current block.

In the example shown in FIG. 25, bdpcm_flag corresponds to differential encoding information specifying whether BDPCM applies to the current block. Since BDPCM is allowed only when the current block is intra-predicted, bdpcm_flag may be signaled only when the prediction mode of the current block is MODE_INTRA. In addition, BDPCM is available only for a luma component signal (cIdx==0), and is available only when the size of the current block is equal to or less than a predetermined size (32×32). However, the availability condition of BDPCM is not limited to the above example, and is available with respect to not only a luma component signal but also a chroma component signal. In addition, information specifying availability of BDPCM may be explicitly signaled at a higher level (sequence level, picture level, slice level, etc.) of the current block.

Only when bdpcm_flag specifies that BDPCM applies the current block, differential encoding information (e.g., bdpcm_dir_flag) specifying the prediction direction of BDPCM may be signaled. When the differential encoding information has a first value (e.g., 0), the prediction direction of BDPCM may specify a horizontal direction and, when the differential encoding information has a second value (e.g., 1), the prediction direction of BDPCM may specify a vertical direction.

Method of Deriving Residual Coefficient Subblock of Transform Unit when Applying BDPCM As described above, BDPCM is applicable in a process of encoding a residual block whose transform is skipped. In signal processing, transform coding means transforming an input signal into a signal in another domain. Specifically, transform in a video compression field means change from a signal in a spatial domain to a signal in a frequency domain. The reason why transform is performed in the video compression field is because efficient compression is possible using the property that, when the signal in the spatial domain is changed to the signal in the frequency domain, information is concentrated in a low frequency domain and a high frequency domain has little information. However, compression efficiency when transform is not performed may be higher according to the characteristics of the signal and, in this case, transform may be skipped.

When transform is skipped, as described above, residual information may be evenly distributed in the block. In addition, a probability that any residual coefficient value in the block is similar to residual coefficient values in the vicinity thereof is very high. In addition, in the case of an intra-predicted transform skip block, a probability that the level of a residual coefficient generated on the bottom right of the block is higher than that of a residual coefficient generated on the top left of the block due to a distance from a reference sample is high. This phenomenon may be more remarkable as the size of the block increases. BDPCM uses the distribution characteristics of the residual coefficient of the intra-predicted skip block as described above. When applying BDPCM, as described above, instead of encoding the (quantized) residual coefficient, a difference generated by performing prediction between residual coefficients on a line-by-line basis in a row or column direction, the magnitude of the level of the residual coefficient to be encoded is reduced. That is, when applying BDPCM, since the reduced level of the coefficient is encoded as described above, it is possible to reduce generation of a context coded bin necessary for coding, which contributes to improvement of throughput of a decoder.

Meanwhile, as in the embodiment described above with reference to FIGS. 18 to 20, when the residual signal whose transform is skipped is signaled, residual coding is performed with respect to a transform block in units of residual coefficient subblocks having a size of 4×4. In addition, when a part of the current block was predicted by ISP and the size of one side of the transform block does not reach 4, 16 coefficients such as 1×16, 16×1, 2×8, 8×2, etc. may be combined to configure coefficient subblocks for the transform block. In this case, by expressing whether all transform coefficients present in the current subblock or residual signals are 0 by coded_sub_block_flag for each residual coefficient subblock, it is possible to save the signal of sig_coeff_flag unnecessarily generated in the subblock.

However, as described above, in BDPCM, prediction between residual signals is performed in units of lines. Accordingly, a probability that a transform coefficient having a value of 0 or the value of the residual signal is generated in units of lines may further increase. As described above, when a residual coefficient subblock is set in 4×4 units, encoding efficiency may be reduced as unnecessary coded_sub_block_flag is transmitted. Hereinafter, a method of setting a residual coefficient subblock to a block similar to a line or line unit without a size of 4×4 when applying BDPCM to the residual domain will be described.

Figure 26:
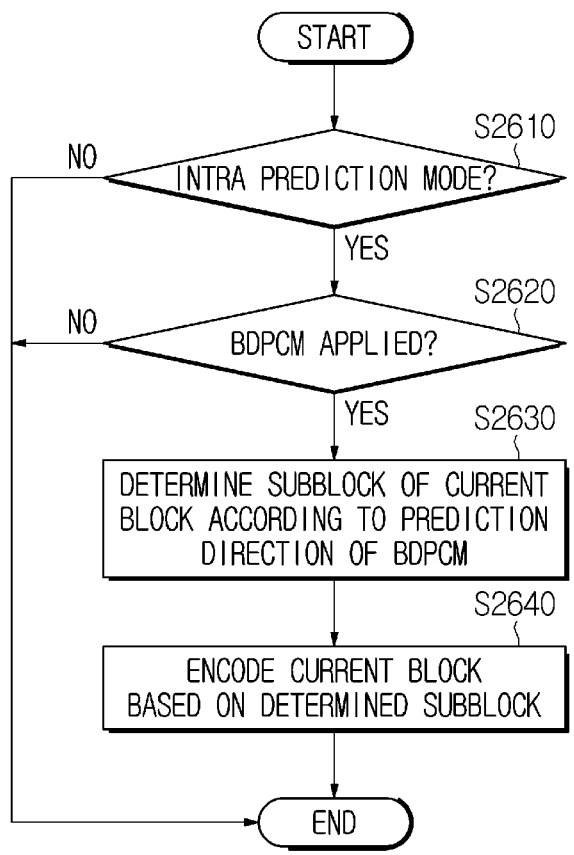
FIG. 26 is a flowchart illustrating a method of encoding an image by an image encoding apparatus according to an embodiment.

FIG. 26 is a flowchart illustrating a method of encoding an image by an image encoding apparatus according to an embodiment. Operation of the image encoding apparatus will be described with reference to FIG. 26.

First, the image encoding apparatus according to an embodiment may determine whether an encoding mode of a current block is an intra prediction mode (S2610). The image encoding apparatus may determine the encoding mode of the current block to be an intra prediction mode based on encoding efficiency between prediction modes.

Next, when the encoding mode of the current block is an intra prediction mode, the image encoding apparatus may determine whether BDPCM applies to the current block (S2620). In an embodiment, when the intra prediction mode of the current block is a vertical prediction mode and encoding efficiency of the residual signal is improved by applying vertical BDPCM, the image encoding apparatus may determine that vertical BDPCM applies to encode the current block. In a similar manner, when the intra prediction mode of the current block is a horizontal prediction mode and encoding efficiency of the residual signal is improved by applying horizontal BDPCM, the image encoding apparatus may determine that horizontal BDPCM applies to encode the current block.

Next, the image encoding apparatus may determine the residual coefficient subblock of the current block according to the prediction direction of BDPCM applying to the current block (S2630).

The image encoding apparatus according to an embodiment may determine the residual coefficient subblock such that any one value of a width or height has a larger value than the other value according to the prediction direction of BDPCM. For example, when the prediction direction of BDPCM is a horizontal direction, the width value of the residual coefficient subblock may be determined to be greater than the height value and, when the prediction direction of BDPCM is a vertical direction, the height value of the residual coefficient subblock may be determined to be greater than the width value. FIG. 27 is a view illustrating a residual coefficient subblock having a size of 16×16 according to an embodiment. FIG. 28 illustrates an example of applying horizontal BDPCM to the subblock of FIG. 27. Like a first residual coefficient subblock 2810 shown in FIG. 28, by applying such a method, it is possible to reduce the magnitudes of the values of the coefficients belonging to the residual coefficient subblock and to reduce the amount of data consumed to express each coefficient.

Meanwhile, the number of coefficients included in the residual coefficient subblock may be limited to a predetermined number, and the predetermined number may be 16. For example, when horizontal BDPCM applies to the current block and the width of the current block is 16 or more, the image encoding apparatus according to an embodiment may determine the size of the residual coefficient subblock of the current block to be 16×1. In a similar manner, when vertical BDPCM applies to the current block and the height of the current block is 16 or more, the image encoding apparatus according to an embodiment may determine the size of the residual coefficient subblock of the current block to be 1×16.

Meanwhile, when the size of one side of the current block is less than 16, the residual coefficient subblock may be determined as linearly as possible while the number of residual signals in the residual coefficient subblocks is maintained at 16. For example, the image encoding apparatus may determine the size of the residual coefficient subblock as shown in Table 3 below according to the size of the current block.

TABLE 3

|  | Size of current block | Size of residual coefficient subblock |
|---|---|---|
| Case of applying vertical BDPCM | M × N, N ≥ 16 | 1 × 16 |
|  | M × N, N = 8 | 2 × 8 |
|  | M × N, N = 4 | 4 × 4 |
|  | M × N, N = 2 | 8 × 2 |
| Case of applying horizontal BDPCM | M × N, M ≥ 16 | 16 × 1 |
|  | M × N, M = 8 | 8 × 2 |
|  | M × N, M = 4 | 4 × 4 |
|  | M × N, M = 2 | 2 × 8 |

In the example of Table 3, when the prediction direction of BDPCM is a horizontal direction and the pixel unit width of the current block is a positive integer M equal to or less than 16, the image encoding apparatus may determine the width of the residual coefficient subblock to be M and determine the height of the residual coefficient subblock to be 16/M. For example, when horizontal BDPCM applies to the current block and the width of the current block is 8, the image encoding apparatus may determine the size of the residual coefficient subblock to be 8×2.

In a similar manner, when the prediction direction of BDPCM is a vertical direction and the pixel unit height of the current block is a positive integer N equal to or less than 16, the image encoding apparatus may determine the height of the residual coefficient subblock to be N and determine the width of the residual coefficient subblock to be 16/N. For example, when vertical BDPCM applies to the current block and the height of the current block is 8, the image encoding apparatus may determine the size of the residual coefficient subblock to be 2×8.

Meanwhile, in another embodiment, the image encoding apparatus may determine the residual coefficient subblock such that any one value of the width or height has a larger value than the other value in a direction perpendicular to the prediction information of BDPCM. For example, when the prediction direction of BDPCM is a horizontal direction, the height value of the residual coefficient subblock may be determined to be a larger value than the width value and, when the prediction direction of BDPCM is a vertical direction, the width value of the residual coefficient subblock may be determined to be a larger value than the height value. Like a second residual coefficient subblock 2820 shown in FIG. 28, by applying such a method, as all the values of coefficients belonging to the residual coefficient subblock are 0, it is possible to set the value of coded_sub_block_flag of the corresponding subblock to 0 and to reduce the amount of data consumed to express each coefficient.

Meanwhile, the number of coefficients included in the residual coefficient subblock may be limited to a predetermined number, and the predetermined number may be 16. For example, when horizontal BDPCM applies to the current block and the width of the current block is 16 or more, the image encoding apparatus according to an embodiment may determine the size of the residual coefficient subblock of the current block to be 1×16. In a similar manner, when vertical BDPCM applies to the current block and the width of the current block is 16 or more, the image encoding apparatus according to an embodiment may determine the size of the residual coefficient subblock of the current block to be 16×1.

Meanwhile, when the size of one side of the current block is less than 16, the image encoding apparatus may determine the size of the residual coefficient subblock as shown in Table 4 below according to the size of the current block.

TABLE 4

|  | Size of current block | Size of residual coefficient subblock |
|---|---|---|
| Case of applying vertical BDPCM | M × N, N ≥ 16 | 1 × 16 |
|  | M × N, N = 8 | 2 × 8 |
|  | M × N, N = 4 | 4 × 4 |
|  | M × N, N = 2 | 8 × 2 |
| Case of applying horizontal BDPCM | M × N, M ≥ 16 | 16 × 1 |
|  | M × N, M = 8 | 8 × 2 |
|  | M × N, M = 4 | 4 × 4 |
|  | M × N, M = 2 | 2 × 8 |

In the example of Table 4, when horizontal BDPCM applies to the current block and the height of the current block 8, the image encoding apparatus may determine the size of the residual coefficient subblock to be 2×8. In a similar manner, when vertical BDPCM applies to the current block and the width of the current block is 8, the image encoding apparatus may determine the size of the residual coefficient subblock to be 8×2.

Meanwhile, in another embodiment, the image encoding apparatus may set a residual coefficient subblock on a line-by-line basis only when the width or height of the current block is equal to or greater than a predetermined size and may determine the size of the residual coefficient subblock as shown in Table 5 below when the width or height is less than the predetermined size.

TABLE 5

| Size of current block | Size of residual coefficient subblock |
|---|---|
| 1 × N, N ≥ 16 | 1 × 16 |
| N × 1, N ≥ 16 | 16 × 1 |
| 2 × N, N ≥ 8 | 2 × 8 |
| N × 2, N ≥ 8 | 8 × 2 |
| Other cases | 4 × 4 |

In the example of Table 5, when horizontal BDPCM applies to the current block and the width of the current block is 16 or more, the image encoding apparatus may determine the size of the residual coefficient subblock to be 16×1 and, otherwise, determine the size of the residual coefficient subblock by referring to Table 5 according to the size of the current block. For example, when the size of the current block is 8×4, the size of the residual coefficient subblock may be determined to be 4×4. Alternatively, when the size of the current block is 8×2, the size of the residual coefficient subblock may be determined to be 8×2.

Meanwhile, in another embodiment, when BDPCM applies to the current block and ISP applies or when only ISP applies, the image encoding apparatus may determine the residual coefficient subblock of the current block according to Table 5, and determine the size of the residual coefficient subblock of the current block to be 4×4 when BDPCM applies but ISP does not apply.

Next, the image encoding apparatus may encode the current block based on the determined residual coefficient subblock (S2640). As described above, the image encoding apparatus may encode a residual signal by differentiating the residual signal of the current block based on the residual coefficient subblock according to the direction of BDPCM and modifying the residual block. Furthermore, as described above with reference to FIG. 25, the image encoding apparatus may set prediction mode information (e.g., pred_mode_flag) of the current block to a value specifying that the current block has been encoded in the intra prediction mode, set differential encoding mode information (e.g., bdpcm_flag) specifying whether to apply BDPCM to the current block to a value specifying that BDPCM applies to the current block, set differential encoding direction information (e.g., bdpcm_dir_flag) specifying the prediction direction of BDPCM to a prediction direction of BDPCM applying to the current block, and perform encoding, thereby generating a bitstream.

Figure 29:
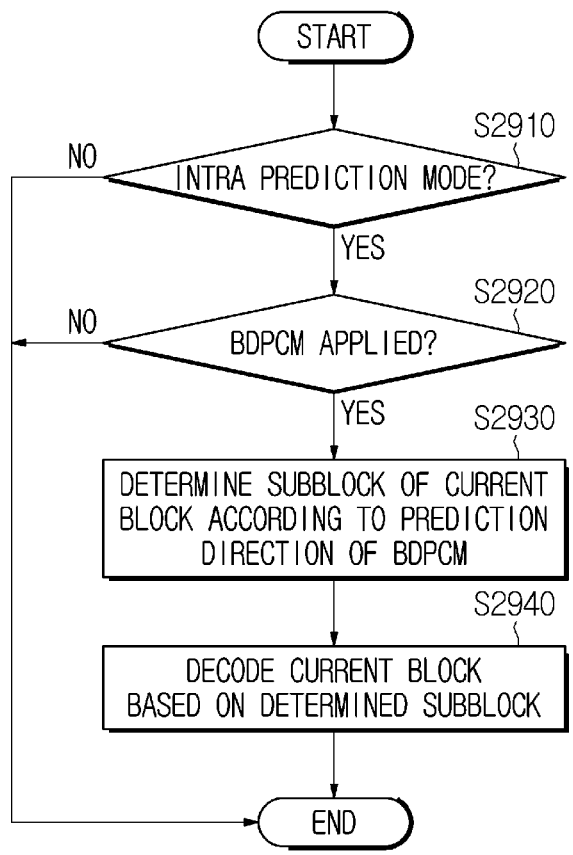
FIG. 29 is a flowchart illustrating a method of decoding an image by an image decoding apparatus according to an embodiment.

FIG. 29 is a flowchart illustrating a method of decoding an image by an image decoding apparatus according to an embodiment. Operation of the image decoding apparatus will be described with reference to FIG. 29.

The image decoding apparatus according to an embodiment may determine whether an encoding mode of a current block is an intra prediction mode (S2910). For example, the image decoding apparatus may obtain prediction mode information (e.g., pred_mode_flag) specifying whether the prediction mode of the current block is an intra mode from a bitstream. When the prediction mode information has a value specifying an intra prediction mode, the image decoding apparatus may determine that the prediction mode of the current block is an intra prediction mode.

Next, when the encoding mode of the current block is an intra prediction mode, the image decoding apparatus may determine whether BDPCM applies to the current block (S2920). For example, the image decoding apparatus may obtain differential encoding mode information (e.g., bdpcm_flag) specifying whether BDPCM applies to the current block from the bitstream. When the differential encoding mode information has a value specifying that BDPCM has applied to the current block, the image decoding apparatus may determine that BDPCM has applied to the current block.

In addition, the image decoding apparatus may obtain differential encoding direction information (e.g., bdpcm_dir_flag) specifying the prediction direction of BDPCM form the bitstream. The image decoding apparatus may determine that the prediction direction of BDPCM is a horizontal direction when the differential encoding direction information has a first value (e.g., 0) and determine that the prediction direction of BDPCM is a vertical direction when the differential encoding direction information has a second value (e.g., 1).

Next, the image decoding apparatus may determine the residual coefficient subblock of the current block according to the prediction direction of BDPCM applying to the current block (S2930). The image decoding apparatus according to an embodiment may determine the residual coefficient subblock of the current block using a method corresponding to determination of the residual coefficient subblock of the current block according to the prediction direction of BDPCM applying to the current block. For example, the image decoding apparatus may determine the residual coefficient subblock of the current block according to the size of the current block and the prediction direction of BDPCM of the current with reference to Tables 3 to 5 above.

For example, when horizontal BDPCM applies to the current block and the width of the current block is 16 or more, the image decoding apparatus may determine the size of the residual coefficient subblock of the current block to be 1×16. In a similar manner, when vertical BDPCM applies to the current block and the height of the current block is 16 or more, the image decoding apparatus according to an embodiment may determine the size of the residual coefficient subblock of the current block to be 16×1.

Similarly, when the size of one side of the current block is less than 16, the image decoding apparatus may determine the residual coefficient subblock as linearly as possible while the number of residual signals in the residual coefficient subblocks is maintained at 16. For example, the image decoding apparatus may determine the size of the residual coefficient subblock as shown in Table 4 below according to the size of the current block.

In the example of Table 4, when the prediction direction of BDPCM is a horizontal direction and the pixel unit width of the current block is a positive integer M equal to or less than 16, the image decoding apparatus may determine the height of the residual coefficient subblock to be N and determine the width of the residual coefficient subblock to be 16/N. For example, when horizontal BDPCM applies to the current block and the height of the current block is 8, the image decoding apparatus may determine the size of the residual coefficient subblock to be 2×8.

In a similar manner, when the prediction direction of BDPCM is a vertical direction and the pixel unit width of the current block is a positive integer M equal to or less than 16, the image decoding apparatus may determine the width of the residual coefficient subblock to be M and determine the height of the residual coefficient subblock to be 16/M. For example, when vertical BDPCM applies to the current block and the height of the current block is 8, the image decoding apparatus may determine the size of the residual coefficient subblock to be 8×2.

Next, the image decoding apparatus may decode the current block based on the determined residual coefficient subblock (S2940). As described above, the image decoding apparatus may decode the residual signal by calculating the residual signal of the current block based on the residual coefficient subblock according to the prediction direction of BDPCM.

Traversal Method of Transform Unit when Applying BDPCM

As described above, in BDPCM, prediction between residual signals is performed in units of lines. Accordingly, a probability that a transform coefficient having a value of 0 or the value of the residual signal is generated in units of lines may further increase. Accordingly, as described above, when traversing the residual signal in the top right diagonal scan, as unnecessary coded_sub_block_flag is transmitted, encoding efficiency may be reduced. Hereinafter, a method of determining the scan order to be a horizontal scan order or a vertical scan order according to the prediction direction of BDPCM when BDPCM applies to the residual domain and performing encoding while traversing the residual signal according to the determined scan order will be described. By applying the traversal method of the transform unit according to the following description to encoding of the image signal along with the above-described method of determining the residual coefficient subblock of the transform unit, the number of subblocks including a non-zero coefficient may be reduced when encoding the image and thus signaling of sig_coeff_flag for a subgroup having coded_sub_block_flag of 0 may be reduced.

Figure 30:
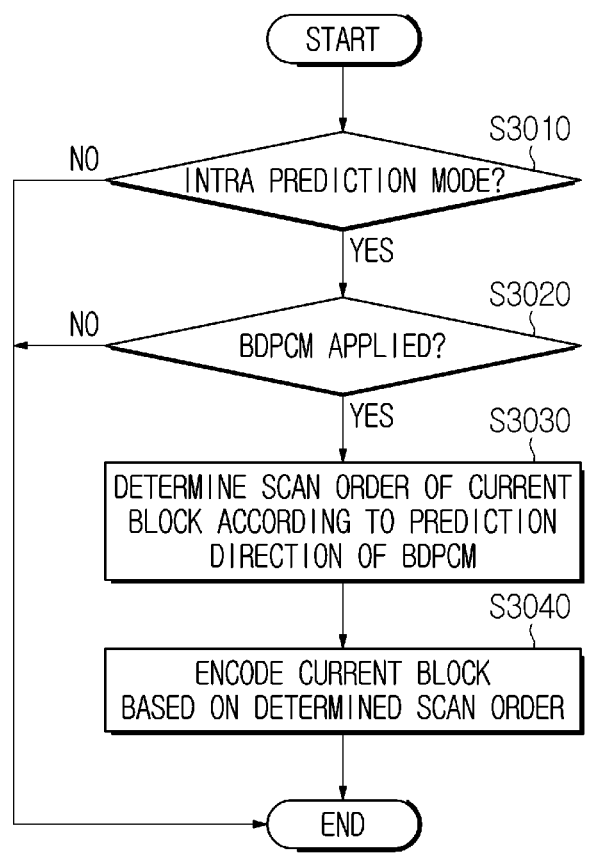
FIG. 30 is a flowchart illustrating a method of encoding an image by an image encoding apparatus according to an embodiment.

FIG. 30 is a flowchart illustrating a method of encoding an image by an image encoding apparatus according to an embodiment. Operation of the image encoding apparatus will be described with reference to FIG. 30.

First, the image encoding apparatus according to an embodiment may determine whether the encoding mode of the current block is an intra prediction mode as in step S2610 (S3010). Next, when the encoding mode of the current block is an intra prediction mode as in step S2610, the image encoding apparatus may determine whether BDPCM applies to the current block (S3020).

Next, the image encoding apparatus may determine the scan order of the current block according to the prediction direction of BDPCM applying to the current block (S3030). The image encoding apparatus according to an embodiment may determine the scan order of the current block to a horizontal scan order or a vertical scan order, when horizontal BDPCM applies to the current block. In a similar manner, when vertical BDPCM applies to the current block, the image encoding apparatus according to an embodiment may determine the scan order of the current block to be a vertical scan order or a horizontal scan order.

FIG. 31 is a view illustrating a third residual coefficient subblock 3110 having a size of 8×1 and a fourth residual coefficient subblock 3120 having a size of 1×8, determined for the current block to which horizontal BDPCM applies to the block shown in FIG. 27. FIG. 31 is for illustration and the subblock may have a size including 16 coefficients.

Hereinafter, a method of determining the scan order of the current block when applying horizontal BDPCM will be described in greater detail. In the following description, a modification may be made to correspond to the case of applying vertical BDPCM and thus the description of vertical BDPCM will be omitted.

In an embodiment, when the current block is split into third residual coefficient subblocks 3110, the image encoding apparatus may determine the scan order of the current block to be a horizontal scan order. When the length of the subblock extends according to the prediction direction of BDPCM, the scan order of the subblock may be determined to be the scan order according to the prediction direction of BDPCM. When the subblock and the scan order are determined in this way, coefficients having a relatively large level magnitude may be relatively distributed and processed in the encoding process of the current block.

Meanwhile, in another embodiment, when the current block is split into third residual coefficient subblocks 3110, the image encoding apparatus may determine the scan order of the current block to be a vertical scan order. When the length of the subblock extends according to the prediction direction of BDPCM, the scan order of the subblock may be determined to be a scan order perpendicular to the prediction direction of BDPCM. When the subblock and the scan order are determined in this way, subblocks having a relatively similar coefficient sequence may be continuously processed in the encoding process of the current block.

Meanwhile, in another embodiment, when the current block is split into fourth residual coefficient subblocks 3120, the image encoding apparatus may determine the scan order of the current block to be a horizontal scan order. When the length of the subblock extends in a direction perpendicular to the prediction direction of BDPCM, the scan order of the subblock may be determined to be a scan order according to the prediction direction of BDPCM. When the subblock and the scan order are determined in this way, a subblock sequence according to a similar coefficient sequence may periodically appear in the encoding process of the current block, and a coefficient having a relatively large level magnitude may be first processed for each cycle. In particular, since a probability that a subblock composed of only 0 is generated is higher, a flag (e.g., coded_sub_block_flag) that inquires whether a non-zero coefficient is present with respect to the corresponding subblock may be encoded into 0 and thus syntax element coding (e.g., sig_coeff_flag, abs_level_gtX_flag[n][ ], par_level_flag[n], etc.) for a residual coefficient may be saved.

Meanwhile, in another embodiment, when the current block is split into fourth residual coefficient subblocks 3120, the image encoding apparatus may determine the scan order of the current block to be a vertical scan order. When the length of the subblock extends in a direction perpendicular to the prediction direction of BDPCM, the scan order of the subblock may be determined to be a scan order perpendicular to the prediction direction of BDPCM. When the subblock and the scan order are determined in this way, a coefficient having a relatively large level magnitude may be first processed in the encoding process of the current block.

Figure 32:
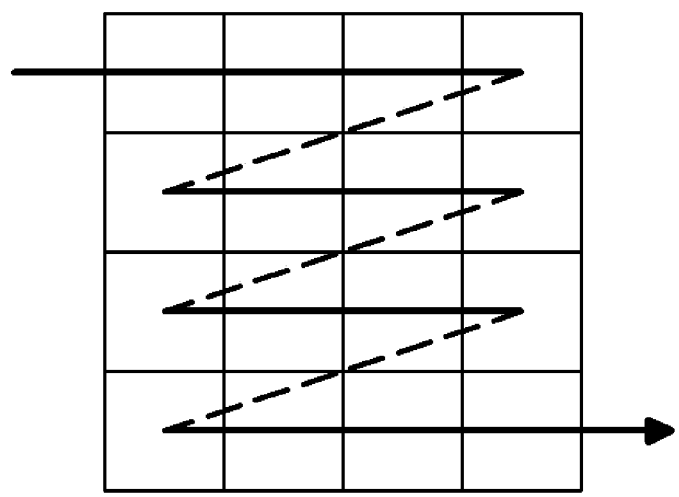
FIGS. 32 and 33 are views illustrating a scan order according to an embodiment.
Figure 33:
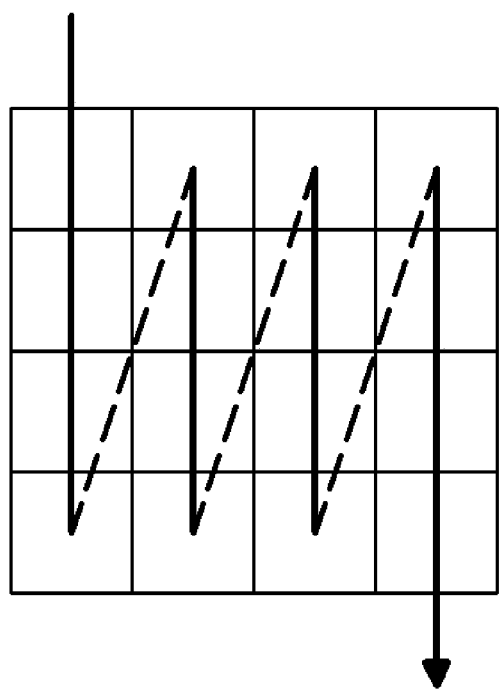

Next, the image encoding apparatus may encode the current block based on the determined scan order (S3040). In an embodiment, the image encoding apparatus may encode a residual signal by traversing the scan order of the residual coefficient subblocks configuring the current block to the scan order determined as in the method described in step S3030. As shown in FIG. 32, when the size of the current block is 16×16 and the size of the residual coefficient subblock is 4×4, the image encoding apparatus may traverse the residual coefficient subblocks of the current block in the horizontal scan order. In a similar manner, as shown in FIG. 33, when the size of the current block is 16×16 and the size of the residual coefficient subblock is 4×4, the image encoding apparatus may traverse the residual coefficient subblocks of the current block in the vertical scan order. The image encoding apparatus may traverse the residual coefficient subblocks based on the direction of BDPCM and determine coded_sub_block_flag for the residual coefficient subblocks.

Meanwhile, the scan order of the residual coefficient subblocks may be signaled to the image decoding apparatus. For example, the image encoding apparatus may encode the scan order information of the residual coefficient subblocks to generate a bitstream and signal it to the image decoding apparatus. For example, the scan order information of the residual coefficient subblocks may specify whether the scan order of the residual coefficient subblocks is equal to the prediction direction of BDPCM or is perpendicular to the prediction direction of BDPCM. For example, when the scan order of the residual coefficient subblocks is equal to the prediction direction of BDPCM, the scan order information of the residual coefficient subblocks may have a first value (e.g., 0), and, when the scan order of the residual coefficient subblocks is perpendicular to the prediction direction of BDPCM, the scan order information of the residual coefficient subblocks may have a second value (e.g., 1).

Meanwhile, when the rule for determining the scan order of the residual coefficient subblocks between the image encoding apparatus and the image decoding apparatus is preset based on the prediction direction of BDPCM, the scan order information of the residual coefficient subblocks may not be signaled. For example, the image encoding apparatus and the image decoding apparatus may determine that the horizontal scan order is used when the prediction direction of BDPCM is a horizontal direction and determine that the vertical scan order is used when the prediction direction of BDPCM is a vertical direction, and vice versa.

Meanwhile, in another embodiment, the image encoding apparatus may encode the residual signal by traversing the scan order of the residual signals in the residual coefficient subblock configuring the current block to the scan order determined in step S3030. As shown in FIG. 32, when the size of the residual coefficient subblock of the current block is 4×4, the image encoding apparatus may traverse the residual signals for the residual coefficient subblock of the current block in the horizontal scan order. In a similar manner, as shown in FIG. 33, when the size of the residual coefficient subblock of the current block is 4×4, the image encoding apparatus may traverse the residual signals for the residual coefficient subblock of the current block in the vertical scan order. The image encoding apparatus may determine sig_coeff flag for the residual signal by traversing the residual signals in the residual coefficient subblock based on the direction of BDPCM. Meanwhile, similar to the scan order of the residual coefficient subblocks described above, the scan order of the residual signals may also be signaled to the image decoding apparatus or signaling may be omitted.

Figure 34:
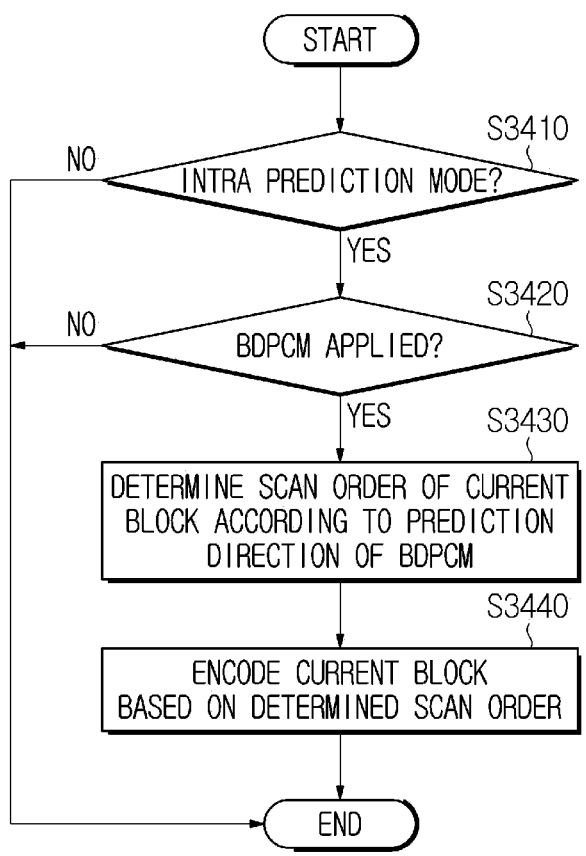
FIG. 34 is a flowchart illustrating a method of decoding an image by an image decoding apparatus according to an embodiment.

FIG. 34 is a flowchart illustrating a method of decoding an image by an image decoding apparatus according to an embodiment. Operation of the image decoding apparatus will be described with reference to FIG. 34.

The image decoding apparatus according to an embodiment may determine whether the encoding mode of the current block is an intra prediction mode as in step S2910 (S3410). Next, when the encoding mode of the current block is an intra prediction mode as in step S2920, the image decoding apparatus may determine whether BDPCM applies to the current block and the prediction direction of BDPCM (S3420).

Next, the image decoding apparatus may determine the scan order of the current block according to the prediction direction of BDPCM applying to the current block (S3430). The image decoding apparatus according to an embodiment may determine the scan order of the current block to correspond to step S303 described above. For example, the image decoding apparatus may receive scan order information or determine the scan order of the current block as described with reference to step S303 described above based on the prediction direction of BDPCM according to the rule of determining the preset scan order. The image decoding apparatus according to an embodiment may determine the scan order of the current block to be a horizontal or vertical scan order, when horizontal BDPCM applies to the current block. In a similar manner, the image decoding apparatus according to an embodiment may determine the scan order of the current block to be a horizontal or vertical scan order, when vertical BDPCM applies to the current block.

Next, the image decoding apparatus may decode the current block based on the determined scan order (S3440). In an embodiment, the image decoding apparatus may decode the residual signal by traversing the scan order of the residual coefficient subblocks configuring the current block to the scan order determined in step S3430. As shown in FIG. 32, when the size of the current block is 16×16 and the size of the residual coefficient subblock is 4×4, the image decoding apparatus may traverse the residual coefficient subblocks of the current block in the horizontal scan order. In a similar manner, as shown in FIG. 33, when the size of the current block is 16×16 and the size of the residual coefficient subblock is 4×4, the image decoding apparatus may traverse the residual coefficient subblocks of the current block in the vertical scan order. The image decoding apparatus may traverse the residual coefficient subblocks based on the direction of BDPCM and obtain coded_sub_block_flag for the residual coefficient subblocks from a bitstream.

Meanwhile, in another embodiment, the image decoding apparatus may decode the residual signal by traversing the scan order of the residual signals in the residual coefficient subblock configuring the current block to the scan order determined in step S3430. As shown in FIG. 32, when the size of the residual coefficient subblock of the current block is 4×4, the image decoding apparatus may traverse the residual signals for the residual coefficient subblock of the current block in the horizontal scan order. In similar manner, as shown in FIG. 33, when the size of the residual coefficient subblock of the current block is 4×4, the image decoding apparatus may traverse the residual signals for the residual coefficient subblock of the current block in the vertical scan order. The image decoding apparatus may traverse the residual signals in the residual coefficient subblock based on the direction of BDPCM and obtain sig_coeff_flag for the residual signal from a bitstream.

Meanwhile, in the above description, in order to adapt residual coding to signal characteristics and statistics of the transform skip level from the BDPCM mode, the following matters may be additionally considered.

In an embodiment, context modeling for coded_sub_block_flag may be determined based on differential encoding mode information bdpcm_flag or differential encoding mode direction information bdpcm_dir_flag. A context model index may be calculated by a sum or logical disjunction of coded_sub_block_flag of right and bottom subblocks of the current residual coefficient subblock.

In an embodiment, a local template for context modeling of sig_coeff_flag may be modified to include a right neighbor NB0 and/or a bottom neighbor NB1 of a current scan position according to differential encoding mode information bdpcm_flag or differential encoding direction information bdpcm_dir_flag.

In an embodiment, in consideration of differential encoding mode information bdpcm_flag or differential encoding direction information bdpcm_dir_flag, a context model for abs_level_gt1_flag and par_level_flag may be used.

In an embodiment, a template for rice parameter derivation may be modified. For example, by selectively considering a left neighbor and a bottom neighbor of a current scan position based on differential encoding mode information bdpcm_flag or differential encoding direction information bdpcm_dir_flag, the template for rice parameter derivation may be modified.

In an embodiment, in relation to coeff_sign_flag context modeling, a sign may be coded using a context-coded bin. The context model (template) may be determined based on differential encoding mode information bdpcm_flag or differential encoding direction information bdpcm_dir_flag. The encoding information of the sign may be parsed after parsing encoding information abs_remainder[ ] of the residual absolute level value when transform is skipped.

In an embodiment, in relation to forward coefficient scanning, as described above, the scan order of subblocks and the scan order of coefficients in the subblock may be determined based on differential encoding mode information bdpcm_flag or differential encoding direction information bdpcm_dir_flag.

Application Embodiment

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 35:
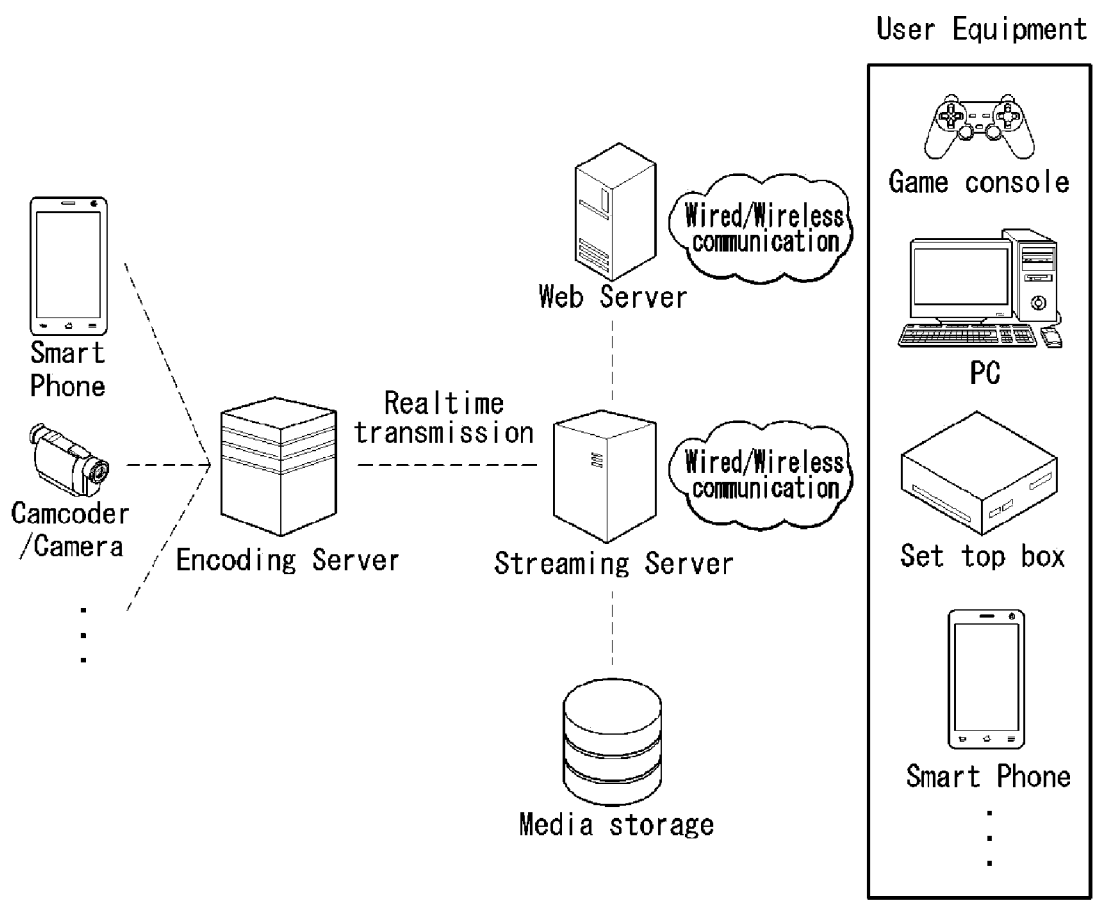
FIG. 35 is a view showing a content streaming system, to which an embodiment of the present disclosure is applicable.

FIG. 35 is a view showing a content streaming system, to which an embodiment of the present disclosure is applicable.

As shown in FIG. 35, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content are received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:
    obtaining information on a current luma block, encoded in an intra prediction mode, from a bitstream;
    obtaining a first residual block for the current luma block based on the information;
    deriving a modified residual block by performing differential decoding with respect to the first residual block, based on differential decoding mode information, obtained from the bitstream, specifying a differential decoding mode of a residual coefficient being applied to the current luma block; and
    deriving a second residual block of the current luma block by performing dequantization with respect to the modified residual block,
    wherein the differential decoding mode information is obtained based on prediction mode information specifying whether a prediction mode of the current luma block is an intra prediction mode or an inter prediction mode, a size of the current luma block, cIdx specifying a chroma component being equal to 0, and information specifying whether the differential decoding mode is available.

2. The image decoding method of claim 1,
    wherein the deriving the modified residual block comprises modifying at least one residual coefficient to be modified among residual coefficients in the first residual block,
    wherein the modifying is performed using the residual coefficient to be modified and a prediction residual coefficient, and wherein the prediction residual coefficient is determined based on a prediction direction specified by differential decoding direction information obtained from the bitstream.

3. The image decoding method of claim 2, wherein the modifying comprises:
adding the residual coefficient to be modified and the prediction residual coefficient; and
assigning the added value to a position of the residual coefficient to be modified, and
wherein the prediction residual coefficient is adjacent to immediately before the residual coefficient to be modified in an order according to the prediction direction.

4. The image decoding method of claim 2, wherein the prediction direction is any one of a vertical direction and a horizontal direction.

5. The image decoding method of claim 1,
wherein the obtaining the first residual block comprises:
splitting the current luma block into at least one residual coefficient subblocks based on a prediction direction specified by differential decoding direction information obtained from the bitstream;
obtaining subblock residual coefficients included in each of the at least one residual coefficient subblocks from the bitstream; and
obtaining the first residual block based on the subblock residual coefficients.

6. The image decoding method of claim 5,
wherein a size of the residual coefficient subblock is determined based on the prediction direction.

7. The image decoding method of claim 6,
wherein a width value of the residual coefficient subblock is determined to be equal to or greater than a height value, based on that the prediction direction is a vertical direction, and
wherein a height value of the residual coefficient subblock is determined to be equal to or greater than a width value, based on that the prediction direction is a horizontal direction.

8. The image decoding method of claim 7,
wherein, based on that the prediction direction is a horizontal direction and a pixel unit height of the current luma block is a positive integer N of 16 or less,
a width of the residual coefficient subblock is determined to be N, and
a height of the residual coefficient subblock is determined to be 16/N.

9. The image decoding method of claim 7,
wherein, based on that the prediction direction is a vertical direction and a pixel unit width of the current luma block is a positive integer N of 16 or less,
a width of the residual coefficient subblock is determined to be N, and
a height of the residual coefficient subblock is determined to be 16/N.

10. The image decoding method of claim 1,
wherein the obtaining the first residual block comprises:
splitting the current luma block into at least one residual coefficient subblocks;
obtaining subblock residual coefficients included in each of the at least one residual coefficient subblocks from the bitstream according to a predetermined scan order of the residual coefficient subblocks; and
obtaining the first residual block based on the subblock residual coefficients,
wherein the predetermined scan order is determined based on a prediction direction specified by differential decoding direction information obtained from the bitstream.

11. The image decoding method of claim 10,
wherein the predetermined scan order is a vertical scan order, based on that the prediction direction is a horizontal direction, and
wherein the predetermined scan order is a horizontal scan order, based on that the prediction direction is a vertical direction.

12. The image decoding method of claim 1,
wherein the obtaining the first residual block comprises:
splitting the current luma block into at least one residual coefficient subblocks;
obtaining subblock residual coefficients included in each of the at least one residual coefficient subblocks from the bitstream according to a predetermined scan order of the residual coefficients in the residual coefficient subblocks; and
obtaining the first residual block based on the subblock residual coefficients,
wherein the predetermined scan order is determined based on a prediction direction specified by differential decoding direction information obtained from the bitstream.

13. An image decoding apparatus comprising:
a memory; and
at least one processor,
wherein the at least one processor is configured to:
obtain information on a current luma block, encoded in an intra prediction mode, from a bitstream;
obtain a first residual block for the current luma block based on the information;
derive a modified residual block by performing differential decoding with respect to the first residual block, based on differential decoding mode information, obtained from the bitstream, specifying a differential decoding mode of a residual coefficient being applied to the current luma block; and
derive a second residual block of the current luma block by performing dequantization with respect to the modified residual block,
wherein the differential decoding mode information is obtained based on prediction mode information specifying whether a prediction mode of the current luma block is an intra prediction mode or an inter prediction mode, a size of the current luma block, cIdx specifying a chroma component being equal to 0, and information specifying whether the differential decoding mode is available.

14. An image encoding method performed by an image encoding apparatus, the image encoding method comprising:
obtaining a current luma block;
deriving a first residual block of the current luma block being predicted in an intra prediction mode;
deriving a second residual block by quantizing the first residual block;
deriving a modified residual block by performing differential encoding with respect to the second residual block, based on a determination that a differential encoding mode of residual coefficients is applied with respect to the current luma block; and
generating a bitstream by encoding prediction mode information specifying whether a prediction mode of the current luma block is an intra prediction mode or an inter prediction mode, information specifying whether a differential encoding mode is available and differential encoding mode information specifying the differential encoding mode of residual coefficients being applied to the current luma block and the modified residual block, wherein the differential encoding mode information is encoded based on whether the prediction mode of the current luma block is the intra prediction mode or the inter prediction mode, a size of the current luma block, cIdx specifying a chroma component being equal to 0, and whether the differential encoding mode is available.

15. A method of transmitting a bitstream comprising:

obtaining a current luma block;

deriving a first residual block of the current luma block being predicted in an intra prediction mode;

deriving a second residual block by quantizing the first residual block;

deriving a modified residual block by performing differential encoding with respect to the second residual block, based on a determination that a differential encoding mode of residual coefficients is applied with respect to the current luma block;

generating the bitstream by encoding prediction mode information specifying whether a prediction mode of the current luma block is an intra prediction mode or an inter prediction mode, information specifying whether a differential encoding mode is available, differential encoding mode information specifying a differential encoding mode of residual coefficients being applied to the current luma block and the modified residual block; and transmitting the bitstream, wherein the differential encoding mode information is encoded based on whether the prediction mode of the current luma block is the intra prediction mode or the inter prediction mode, a size of the current luma block, cIdx specifying a chroma component being equal to 0, and whether the differential encoding mode is available.

* * * * *